US012578245B2

(12) United States Patent
Sobhani et al.

(10) Patent No.: US 12,578,245 B2
(45) Date of Patent: Mar. 17, 2026

(54) SELF-LEVELING SENSOR ASSEMBLY

(71) Applicant: Mueller International, LLC, Atlanta, GA (US)

(72) Inventors: Mohammad Hassan Sobhani, Burlington (CA); Andrew Wallace, Richmond Hill (CA); Daryl Lee Gibson, Cleveland, TN (US)

(73) Assignee: Mueller International, LLC, Atlanta, GA (US)

( * ) Notice: Subject to any disclaimer, the term of this patent is extended or adjusted under 35 U.S.C. 154(b) by 469 days.

(21) Appl. No.: 17/976,314

(22) Filed: Oct. 28, 2022

(65) Prior Publication Data

US 2024/0142331 A1 May 2, 2024

(51) Int. Cl.
G01M 3/02 (2006.01)
E03B 9/06 (2006.01)

(52) U.S. Cl.
CPC ................. G01M 3/02 (2013.01); E03B 9/06 (2013.01)

(58) Field of Classification Search
CPC ...................................................... G01M 3/02
USPC ............................................................. 73/40
See application file for complete search history.

(56) References Cited

U.S. PATENT DOCUMENTS

| | | |
|---|---|---|
| 1,738,094 A | 12/1929 | Caldwell |
| 2,171,173 A | 8/1939 | Coyer |
| 3,254,528 A | 6/1966 | Michael |
| 3,592,967 A | 7/1971 | Harris |

| | | |
|---|---|---|
| 3,612,922 A | 10/1971 | Furnival |
| 3,662,600 A | 5/1972 | Rosano, Jr. et al. |
| 3,673,856 A | 7/1972 | Panigati |
| 3,731,534 A | 5/1973 | Painley et al. |
| 3,815,129 A | 6/1974 | Sweany |
| 4,000,753 A | 1/1977 | Ellis |
| 4,056,970 A | 11/1977 | Sollish |
| 4,083,229 A | 4/1978 | Anway |
| 4,156,156 A | 5/1979 | Sweany et al. |
| 4,333,028 A | 6/1982 | Panton |
| 4,431,873 A | 2/1984 | Dunn et al. |

(Continued)

FOREIGN PATENT DOCUMENTS

| | | |
|---|---|---|
| AU | 2011265675 | 5/2015 |
| AU | 2015202550 | 11/2017 |

(Continued)

OTHER PUBLICATIONS

US 11,296,403 B2, 04/2022, Gibson et al. (withdrawn)

(Continued)

*Primary Examiner* — Walter L Lindsay, Jr.
*Assistant Examiner* — Philip T Fadul
(74) *Attorney, Agent, or Firm* — Taylor Duma LLP

(57) ABSTRACT

A self-leveling sensor assembly comprising an outer bushing defining a bushing passage, a bushing axis extending centrally through the bushing passage; an inner housing received in the bushing passage and rotatable about the bushing axis, the inner housing comprising a housing weight disposed at a first housing side of the inner housing; and a vibration sensor mounted to the inner housing and defining a sensor axis; wherein the housing weight is configured to pull the first housing side of the inner housing downward to rotate the inner housing and the vibration sensor about the bushing axis and to align the sensor axis is a desired orientation.

31 Claims, 11 Drawing Sheets

(56)          References Cited

U.S. PATENT DOCUMENTS

| | | |
|---|---|---|
| 4,462,249 A | 7/1984 | Adams |
| 4,467,236 A | 8/1984 | Kolm et al. |
| 4,543,817 A | 10/1985 | Sugiyama |
| 4,638,314 A | 1/1987 | Keller |
| 4,763,686 A | 8/1988 | Laurel |
| 4,796,466 A | 1/1989 | Farmer |
| 4,827,969 A | 5/1989 | Lyasko |
| 4,844,396 A | 7/1989 | Norton |
| 4,893,679 A | 1/1990 | Martin et al. |
| 4,930,358 A | 6/1990 | Motegi et al. |
| 4,984,498 A | 1/1991 | Fishman |
| 5,038,614 A | 8/1991 | Bseisu et al. |
| 5,052,215 A | 10/1991 | Lewis |
| 5,078,006 A | 1/1992 | Maresca et al. |
| 5,085,082 A | 2/1992 | Cantor et al. |
| 5,090,234 A | 2/1992 | Maresca et al. |
| 5,117,676 A | 6/1992 | Chang |
| 5,118,464 A | 6/1992 | Richardson et al. |
| 5,163,314 A | 11/1992 | Maresca et al. |
| 5,165,280 A | 11/1992 | Sternberg et al. |
| 5,170,657 A | 12/1992 | Maresca et al. |
| 5,174,155 A | 12/1992 | Sugimoto |
| 5,184,851 A | 2/1993 | Sparling et al. |
| 5,187,973 A | 2/1993 | Kunze et al. |
| 5,189,904 A | 3/1993 | Maresca et al. |
| 5,201,226 A | 4/1993 | John et al. |
| 5,203,202 A | 4/1993 | Spencer |
| 5,205,173 A | 4/1993 | Allen |
| 5,209,125 A | 5/1993 | Kalinoski et al. |
| 5,218,859 A | 6/1993 | Stenstrom et al. |
| 5,243,862 A | 9/1993 | Latimer |
| 5,251,940 A | 10/1993 | Demoss et al. |
| 5,254,944 A | 10/1993 | Holmes et al. |
| 5,272,646 A | 12/1993 | Farmer |
| 5,279,160 A | 1/1994 | Koch |
| 5,287,884 A | 2/1994 | Cohen |
| 5,298,894 A | 3/1994 | Cerny et al. |
| 5,301,985 A | 4/1994 | Terzini |
| 5,303,592 A | 4/1994 | Livingston |
| 5,319,956 A | 6/1994 | Bogle et al. |
| 5,333,501 A | 8/1994 | Okada et al. |
| 5,335,547 A | 8/1994 | Nakajima et al. |
| 5,343,737 A | 9/1994 | Baumoel |
| 5,349,568 A | 9/1994 | Kupperman et al. |
| 5,351,655 A | 10/1994 | Nuspl |
| 5,361,636 A | 11/1994 | Farstad et al. |
| 5,367,911 A | 11/1994 | Jewell et al. |
| 5,385,049 A | 1/1995 | Hunt et al. |
| 5,396,800 A | 3/1995 | Drinon et al. |
| 5,408,883 A | 4/1995 | Clark et al. |
| 5,416,724 A | 5/1995 | Savic |
| 5,461,906 A | 10/1995 | Bogle et al. |
| 5,519,184 A | 5/1996 | Umlas |
| 5,526,691 A | 6/1996 | Latimer et al. |
| 5,531,099 A | 7/1996 | Russo |
| 5,548,530 A | 8/1996 | Baumoel |
| 5,581,037 A | 12/1996 | Kwun et al. |
| 5,591,912 A | 1/1997 | Spisak et al. |
| 5,602,327 A | 2/1997 | Torizuka et al. |
| 5,611,948 A | 3/1997 | Hawkins |
| 5,619,423 A | 4/1997 | Scrantz |
| 5,623,203 A | 4/1997 | Hosohara et al. |
| 5,633,467 A | 5/1997 | Paulson |
| 5,639,958 A | 6/1997 | Lange |
| 5,655,561 A | 8/1997 | Wendel et al. |
| 5,686,828 A | 11/1997 | Peterman et al. |
| 5,708,195 A | 1/1998 | Kurisu et al. |
| 5,708,211 A | 1/1998 | Jepson et al. |
| 5,746,611 A | 5/1998 | Brown et al. |
| 5,754,101 A | 5/1998 | Tsunetomi et al. |
| 5,760,306 A | 6/1998 | Wyatt et al. |
| 5,789,720 A | 8/1998 | Lagally et al. |
| 5,798,457 A | 8/1998 | Paulson |
| 5,838,633 A | 11/1998 | Sinha |
| 5,866,820 A | 2/1999 | Camplin et al. |
| 5,892,163 A | 4/1999 | Johnson |
| 5,898,412 A | 4/1999 | Jones et al. |
| 5,907,100 A | 5/1999 | Cook |
| 5,917,454 A | 6/1999 | Hill et al. |
| 5,965,818 A | 10/1999 | Wang |
| 5,970,434 A | 10/1999 | Brophy et al. |
| 5,974,862 A | 11/1999 | Lander et al. |
| 5,987,990 A | 11/1999 | Worthington et al. |
| 6,000,277 A | 12/1999 | Smith |
| 6,000,288 A | 12/1999 | Kwun et al. |
| 6,003,376 A | 12/1999 | Burns et al. |
| 6,009,897 A * | 1/2000 | Hill .......................... F16K 35/06<br>137/364 |
| 6,023,986 A | 2/2000 | Smith et al. |
| 6,035,717 A | 3/2000 | Carodiskey |
| 6,058,957 A | 5/2000 | Honigsbaum |
| 6,076,407 A | 6/2000 | Levesque et al. |
| 6,082,193 A | 7/2000 | Paulson |
| 6,089,253 A | 7/2000 | Stehling et al. |
| 6,102,444 A | 8/2000 | Kozey |
| 6,104,349 A | 8/2000 | Cohen |
| 6,125,703 A | 10/2000 | MacLauchlan et al. |
| 6,127,823 A | 10/2000 | Atherton |
| 6,127,987 A | 10/2000 | Maruyama et al. |
| 6,133,885 A | 10/2000 | Luniak et al. |
| 6,138,512 A | 10/2000 | Roberts et al. |
| 6,138,514 A | 10/2000 | Iwamoto et al. |
| 6,164,137 A | 12/2000 | Hancock et al. |
| 6,170,334 B1 | 1/2001 | Paulson |
| 6,175,380 B1 | 1/2001 | Van Den Bosch |
| 6,181,294 B1 | 1/2001 | Porter et al. |
| 6,192,352 B1 | 2/2001 | Alouani et al. |
| 6,243,657 B1 | 6/2001 | Tuck et al. |
| 6,267,000 B1 | 7/2001 | Harper et al. |
| 6,276,213 B1 | 8/2001 | Lee et al. |
| 6,296,066 B1 | 10/2001 | Terry |
| 6,343,510 B1 | 2/2002 | Neeson et al. |
| 6,363,788 B1 | 4/2002 | Gorman et al. |
| 6,389,881 B1 | 5/2002 | Yang et al. |
| 6,401,525 B1 | 6/2002 | Jamieson |
| 6,404,343 B1 | 6/2002 | Andou et al. |
| 6,442,999 B1 | 9/2002 | Baumoel |
| 6,450,542 B1 | 9/2002 | McCue |
| 6,453,247 B1 | 9/2002 | Hunaidi |
| 6,470,749 B1 | 10/2002 | Han et al. |
| 6,530,263 B1 | 3/2003 | Chana |
| 6,561,032 B1 | 5/2003 | Hunaidi |
| 6,567,006 B1 | 5/2003 | Lander et al. |
| 6,578,422 B2 | 6/2003 | Lam et al. |
| 6,595,038 B2 | 7/2003 | Williams et al. |
| 6,606,059 B1 | 8/2003 | Barabash |
| 6,624,628 B1 | 9/2003 | Kwun et al. |
| 6,639,562 B2 | 10/2003 | Suganthan et al. |
| 6,647,762 B1 | 11/2003 | Roy |
| 6,651,503 B2 | 11/2003 | Bazarov et al. |
| 6,666,095 B2 | 12/2003 | Thomas et al. |
| 6,667,709 B1 | 12/2003 | Hansen et al. |
| 6,707,762 B1 | 3/2004 | Goodman et al. |
| 6,710,600 B1 | 3/2004 | Kopecki et al. |
| 6,725,705 B1 | 4/2004 | Huebler et al. |
| 6,734,674 B1 | 5/2004 | Struse |
| 6,745,136 B2 | 6/2004 | Lam et al. |
| 6,751,560 B1 | 6/2004 | Tingley et al. |
| 6,763,730 B1 | 7/2004 | Wray |
| 6,772,636 B2 | 8/2004 | Lam et al. |
| 6,772,637 B2 | 8/2004 | Bazarov et al. |
| 6,772,638 B2 | 8/2004 | Matney et al. |
| 6,781,369 B2 | 8/2004 | Paulson et al. |
| 6,782,751 B2 | 8/2004 | Linares et al. |
| 6,789,427 B2 | 9/2004 | Batzinger et al. |
| 6,791,318 B2 | 9/2004 | Paulson et al. |
| 6,799,455 B2 | 10/2004 | Neefeldt et al. |
| 6,799,466 B2 | 10/2004 | Chinn |
| 6,813,949 B2 | 11/2004 | Masaniello et al. |
| 6,813,950 B2 | 11/2004 | Glascock et al. |
| 6,816,072 B2 | 11/2004 | Zoratti |
| 6,820,016 B2 | 11/2004 | Brown et al. |
| 6,822,742 B1 | 11/2004 | Kalayeh et al. |
| 6,843,131 B2 | 1/2005 | Graff et al. |

(56)                References Cited

U.S. PATENT DOCUMENTS

| | | | |
|---|---|---|---|
| 6,848,313 B2 | 2/2005 | Krieg et al. |
| 6,851,319 B2 | 2/2005 | Ziola et al. |
| 6,889,703 B2 | 5/2005 | Bond |
| 6,904,818 B2 | 6/2005 | Harthorn et al. |
| 6,912,472 B2 | 6/2005 | Mizushina et al. |
| 6,920,792 B2 | 7/2005 | Flora et al. |
| 6,931,931 B2 | 8/2005 | Graff et al. |
| 6,935,178 B2 | 8/2005 | Prause |
| 6,945,113 B2 | 9/2005 | Siverling et al. |
| 6,957,157 B2 | 10/2005 | Lander |
| 6,968,727 B2 | 11/2005 | Kwun et al. |
| 6,978,832 B2 | 12/2005 | Gardner et al. |
| 7,051,577 B2 | 5/2006 | Komninos |
| 7,080,557 B2 | 7/2006 | Adnan |
| 7,109,929 B1 | 9/2006 | Ryken, Jr. |
| 7,111,516 B2 | 9/2006 | Bazarov et al. |
| 7,128,083 B2 | 10/2006 | Fleury, Jr. et al. |
| 7,140,253 B2 | 11/2006 | Merki et al. |
| 7,143,659 B2 | 12/2006 | Stout et al. |
| 7,171,854 B2 | 2/2007 | Nagashima et al. |
| 7,231,331 B2 | 6/2007 | Davis |
| 7,234,355 B2 | 6/2007 | Dewangan et al. |
| 7,240,574 B2 | 7/2007 | Sapelnikov |
| 7,255,007 B2 | 8/2007 | Messer et al. |
| 7,261,002 B1 | 8/2007 | Gysling et al. |
| 7,266,992 B2 | 9/2007 | Shamout et al. |
| 7,274,996 B2 | 9/2007 | Lapinski |
| 7,283,063 B2 | 10/2007 | Salser, Jr. |
| 7,284,433 B2 | 10/2007 | Ales et al. |
| 7,293,461 B1 | 11/2007 | Girndt |
| 7,299,697 B2 | 11/2007 | Siddu et al. |
| 7,310,877 B2 | 12/2007 | Cao et al. |
| 7,328,618 B2 | 2/2008 | Hunaidi et al. |
| 7,331,215 B2 | 2/2008 | Bond |
| 7,356,444 B2 | 4/2008 | Blemel |
| 7,360,462 B2 | 4/2008 | Nozaki et al. |
| 7,373,808 B2 | 5/2008 | Zanker et al. |
| 7,380,466 B2 | 6/2008 | Deeg |
| 7,383,721 B2 | 6/2008 | Parsons et al. |
| 7,392,709 B2 | 7/2008 | Eckert |
| 7,405,391 B2 | 7/2008 | Ogisu et al. |
| 7,412,882 B2 | 8/2008 | Lazar et al. |
| 7,412,890 B1 | 8/2008 | Johnson et al. |
| 7,414,395 B2 | 8/2008 | Gao et al. |
| 7,426,879 B2 | 9/2008 | Nozaki et al. |
| 7,458,267 B2 | 12/2008 | McCoy |
| 7,475,596 B2 | 1/2009 | Hunaidi et al. |
| 7,493,817 B2 | 2/2009 | Germata |
| 7,523,666 B2 | 4/2009 | Thompson et al. |
| 7,526,944 B2 | 5/2009 | Sabata et al. |
| 7,530,270 B2 | 5/2009 | Nozaki et al. |
| 7,543,500 B2 | 6/2009 | Litzenberg et al. |
| 7,554,345 B2 | 6/2009 | Vokey |
| 7,564,540 B2 | 7/2009 | Paulson |
| 7,587,942 B2 | 9/2009 | Smith et al. |
| 7,590,496 B2 | 9/2009 | Blemel |
| 7,596,458 B2 | 9/2009 | Lander |
| 7,607,351 B2 | 10/2009 | Allison et al. |
| 7,623,427 B2 | 11/2009 | Jann et al. |
| 7,647,829 B2 | 1/2010 | Junker et al. |
| 7,650,790 B2 | 1/2010 | Wright |
| 7,657,403 B2 | 2/2010 | Stripf et al. |
| 7,668,670 B2 | 2/2010 | Lander |
| 7,680,625 B2 | 3/2010 | Trowbridge et al. |
| 7,690,258 B2 | 4/2010 | Minagi et al. |
| 7,694,564 B2 | 4/2010 | Brignac et al. |
| 7,696,940 B1 | 4/2010 | MacDonald |
| 7,711,217 B2 | 5/2010 | Takahashi et al. |
| 7,751,989 B2 | 7/2010 | Owens et al. |
| 7,810,378 B2 | 10/2010 | Hunaidi et al. |
| 7,980,317 B1 | 7/2011 | Preta et al. |
| 8,009,108 B2 | 8/2011 | Eisenbeis et al. |
| 8,018,126 B2 | 9/2011 | Umeki |
| 8,020,579 B2 | 9/2011 | Ruhs |
| 8,319,508 B2 | 11/2012 | Vokey |
| 8,353,309 B1 | 1/2013 | Embry et al. |
| 8,415,860 B2 | 4/2013 | Malkin |
| 8,589,092 B2 | 11/2013 | Plouffe et al. |
| 8,614,745 B1 | 12/2013 | Al Azemi |
| 8,657,021 B1 | 2/2014 | Preta et al. |
| 8,668,206 B2 | 3/2014 | Ball |
| 8,674,830 B2 | 3/2014 | Lanham et al. |
| 8,823,509 B2 | 9/2014 | Hyland et al. |
| 8,931,505 B2 | 1/2015 | Hyland et al. |
| 9,048,419 B2 | 6/2015 | Xu |
| 9,053,519 B2 | 6/2015 | Scolnicov et al. |
| 9,291,520 B2 | 3/2016 | Fleury, Jr. et al. |
| 9,315,973 B2 | 4/2016 | Varman et al. |
| 9,496,943 B2 | 11/2016 | Parish et al. |
| 9,528,903 B2 | 12/2016 | Zusman |
| 9,562,623 B2 | 2/2017 | Clark |
| 9,593,999 B2 | 3/2017 | Fleury |
| 9,670,650 B2 | 6/2017 | Pinney et al. |
| 9,772,250 B2 | 9/2017 | Richarz et al. |
| 9,780,433 B2 | 10/2017 | Schwengler et al. |
| 9,799,204 B2 | 10/2017 | Hyland et al. |
| 9,849,322 B2 | 12/2017 | Hyland et al. |
| 9,861,848 B2 | 1/2018 | Hyland et al. |
| 9,970,805 B2 | 5/2018 | Cole et al. |
| 10,175,135 B2 | 1/2019 | Dintakurt et al. |
| 10,283,857 B2 | 5/2019 | Ortiz et al. |
| 10,305,178 B2 | 5/2019 | Gibson et al. |
| 10,317,384 B2 | 6/2019 | Morrow et al. |
| 10,386,257 B2 | 8/2019 | Fleury, Jr. et al. |
| 10,857,403 B2 | 12/2020 | Hyland et al. |
| 10,859,462 B2 | 12/2020 | Gibson et al. |
| 10,881,888 B2 | 1/2021 | Hyland et al. |
| 11,047,761 B1 | 6/2021 | Frackelton et al. |
| 11,067,464 B2 | 7/2021 | Moreno et al. |
| 11,336,004 B2 | 5/2022 | Gibson et al. |
| 11,342,656 B2 | 5/2022 | Gibson et al. |
| 11,422,054 B2 | 8/2022 | Gibson et al. |
| 11,469,494 B2 | 10/2022 | Ortiz et al. |
| 11,473,993 B2 | 10/2022 | Gibson et al. |
| 11,527,821 B2 | 12/2022 | Ortiz et al. |
| 11,542,690 B2 | 1/2023 | Gibson et al. |
| 11,590,376 B2 | 2/2023 | Hyland et al. |
| 11,624,674 B2 | 4/2023 | Gibson et al. |
| 11,630,021 B2 | 4/2023 | Fleury, Jr. et al. |
| 11,652,284 B2 | 5/2023 | Ortiz et al. |
| 11,680,865 B2 | 6/2023 | Fleury, Jr. et al. |
| 11,692,901 B2 | 7/2023 | Gibson et al. |
| 11,837,782 B2 | 12/2023 | Ortiz et al. |
| 12,078,572 B2 | 9/2024 | Gibson et al. |
| 12,212,053 B2 | 1/2025 | Gibson et al. |
| 12,489,202 B2 | 12/2025 | Gibson et al. |
| 2001/0045129 A1 | 11/2001 | Williams et al. |
| 2002/0043549 A1 | 4/2002 | Taylor et al. |
| 2002/0124633 A1 | 9/2002 | Yang et al. |
| 2002/0159584 A1 | 10/2002 | Sindalovsky et al. |
| 2003/0107485 A1 | 6/2003 | Zoratti |
| 2003/0150488 A1 | 8/2003 | Fleury, Jr. et al. |
| 2003/0193193 A1 | 10/2003 | Harrington et al. |
| 2004/0129312 A1 | 7/2004 | Cuzzo et al. |
| 2004/0173006 A1 | 9/2004 | McCoy et al. |
| 2004/0187922 A1 | 9/2004 | Fleury, Jr. et al. |
| 2004/0201215 A1 | 10/2004 | Steingass |
| 2005/0005680 A1 | 1/2005 | Anderson |
| 2005/0067022 A1 | 3/2005 | Istre |
| 2005/0072214 A1 | 4/2005 | Cooper |
| 2005/0121880 A1 | 6/2005 | Santangelo |
| 2005/0153586 A1 | 7/2005 | Girinon |
| 2005/0279169 A1 | 12/2005 | Lander |
| 2006/0101915 A1 | 5/2006 | Thompson et al. |
| 2006/0173648 A1 | 8/2006 | Chang |
| 2006/0174707 A1 | 8/2006 | Zhang |
| 2006/0201550 A1 | 9/2006 | Blyth et al. |
| 2006/0283251 A1 | 12/2006 | Hunaidi |
| 2006/0284784 A1 | 12/2006 | Smith et al. |
| 2007/0044552 A1 | 3/2007 | Huang |
| 2007/0051187 A1 | 3/2007 | McDearmon |
| 2007/0113618 A1 | 5/2007 | Yokoi et al. |
| 2007/0130317 A1 | 6/2007 | Lander |
| 2007/0295406 A1 | 12/2007 | German et al. |

(56) References Cited

U.S. PATENT DOCUMENTS

| | | | |
|---|---|---|---|
| 2008/0068216 A1 | 3/2008 | Borisov | |
| 2008/0078567 A1 | 4/2008 | Miller et al. | |
| 2008/0079640 A1 | 4/2008 | Yang | |
| 2008/0129536 A1 | 6/2008 | Randall et al. | |
| 2008/0168840 A1 | 7/2008 | Seeley et al. | |
| 2008/0189056 A1 | 8/2008 | Heidl et al. | |
| 2008/0238711 A1 | 10/2008 | Payne et al. | |
| 2008/0281534 A1 | 11/2008 | Hurley | |
| 2008/0307623 A1 | 12/2008 | Furukawa | |
| 2008/0314122 A1 | 12/2008 | Hunaidi | |
| 2009/0025798 A1 | 1/2009 | Garcia et al. | |
| 2009/0044628 A1 | 2/2009 | Lotscher | |
| 2009/0133887 A1 | 5/2009 | Garcia et al. | |
| 2009/0139336 A1 | 6/2009 | Trowbridge, Jr. et al. | |
| 2009/0182099 A1 | 7/2009 | Noro et al. | |
| 2009/0214941 A1 | 8/2009 | Buck et al. | |
| 2009/0278293 A1 | 11/2009 | Yoshinaka et al. | |
| 2009/0301571 A1 | 12/2009 | Ruhs | |
| 2010/0077234 A1 | 3/2010 | Das | |
| 2010/0156632 A1 | 6/2010 | Hyland et al. | |
| 2010/0236036 A1 | 9/2010 | Stark | |
| 2010/0259461 A1 | 10/2010 | Eisenbeis et al. | |
| 2010/0290201 A1 | 11/2010 | Takeuchi et al. | |
| 2010/0295672 A1 | 11/2010 | Hyland et al. | |
| 2010/0302111 A1 | 12/2010 | Kotaka et al. | |
| 2011/0063124 A1 | 3/2011 | Bartram et al. | |
| 2011/0063172 A1 | 3/2011 | Podduturi | |
| 2011/0079402 A1 | 4/2011 | Darby et al. | |
| 2011/0102281 A1 | 5/2011 | Su | |
| 2011/0162463 A1 | 7/2011 | Allen | |
| 2011/0308638 A1 | 12/2011 | Hyland et al. | |
| 2012/0007743 A1 | 1/2012 | Solomon | |
| 2012/0007744 A1 | 1/2012 | Pal et al. | |
| 2012/0049021 A1 | 3/2012 | Nahar | |
| 2012/0098710 A1 | 4/2012 | Seal et al. | |
| 2012/0169560 A1 | 7/2012 | Lee et al. | |
| 2012/0296580 A1 | 11/2012 | Barkay | |
| 2012/0324985 A1 | 12/2012 | Gu et al. | |
| 2013/0036796 A1 | 2/2013 | Fleury et al. | |
| 2013/0041601 A1 | 2/2013 | Dintakurti et al. | |
| 2013/0049968 A1 | 2/2013 | Fleury, Jr. | |
| 2013/0145826 A1 | 6/2013 | Richarz et al. | |
| 2013/0211797 A1 | 8/2013 | Scolnicov | |
| 2013/0229262 A1 | 9/2013 | Bellows | |
| 2013/0298664 A1 | 11/2013 | Gillette, II | |
| 2013/0321231 A1 | 12/2013 | Flores-Cuadras | |
| 2014/0118202 A1 | 5/2014 | Lin et al. | |
| 2014/0197999 A1 | 7/2014 | Podduturi | |
| 2014/0206210 A1 | 7/2014 | Ritner | |
| 2014/0225787 A1 | 8/2014 | Ramachandran et al. | |
| 2014/0261699 A1 | 9/2014 | Gifford | |
| 2014/0373941 A1 | 12/2014 | Varman et al. | |
| 2015/0070221 A1 | 3/2015 | Schwengler et al. | |
| 2015/0082868 A1 | 3/2015 | Hyland | |
| 2015/0128714 A1 | 5/2015 | Moss | |
| 2015/0247777 A1 | 9/2015 | Kondou | |
| 2016/0001114 A1 | 1/2016 | Hyland | |
| 2016/0013565 A1 | 1/2016 | Ortiz | |
| 2016/0018283 A1 | 1/2016 | Fleury et al. | |
| 2016/0084694 A1* | 3/2016 | Cole | G01F 15/007 |
| | | | 29/525.08 |
| 2016/0097696 A1 | 4/2016 | Zusman | |
| 2016/0187157 A1 | 6/2016 | Azulay et al. | |
| 2017/0018837 A1 | 1/2017 | Bietz | |
| 2017/0072238 A1 | 3/2017 | Silvers et al. | |
| 2017/0121949 A1 | 5/2017 | Fleury et al. | |
| 2017/0130431 A1 | 5/2017 | Pinney et al. | |
| 2017/0237158 A1 | 8/2017 | Gibson | |
| 2017/0237165 A1 | 8/2017 | Ortiz et al. | |
| 2017/0358856 A1 | 12/2017 | Elmerick et al. | |
| 2018/0080849 A1 | 3/2018 | Showcatally et al. | |
| 2018/0093117 A1 | 4/2018 | Hyland et al. | |
| 2018/0224349 A1 | 8/2018 | Fleury, Jr. et al. | |
| 2019/0024352 A1 | 1/2019 | Ozburn | |
| 2019/0214717 A1 | 7/2019 | Gibson et al. | |
| 2019/0214718 A1 | 7/2019 | Ortiz et al. | |
| 2019/0316983 A1 | 10/2019 | Fleury, Jr. et al. | |
| 2020/0069987 A1 | 3/2020 | Hyland et al. | |
| 2020/0072697 A1* | 3/2020 | Gibson | E03B 9/10 |
| 2020/0212549 A1 | 7/2020 | Gibson et al. | |
| 2020/0232863 A1 | 7/2020 | Moreno et al. | |
| 2020/0232864 A1 | 7/2020 | Moreno et al. | |
| 2020/0378859 A1 | 12/2020 | Gibson et al. | |
| 2021/0023408 A1 | 1/2021 | Hyland et al. | |
| 2021/0041323 A1 | 2/2021 | Gibson et al. | |
| 2021/0247261 A1 | 8/2021 | Gibson et al. | |
| 2021/0249765 A1 | 8/2021 | Ortiz et al. | |
| 2021/0302056 A1* | 9/2021 | Eskew | G01M 1/122 |
| 2021/0355661 A1 | 11/2021 | Gibson et al. | |
| 2022/0082467 A1 | 3/2022 | Fleury, Jr. et al. | |
| 2022/0190471 A1 | 6/2022 | Gibson et al. | |
| 2022/0291073 A1 | 9/2022 | Gibson et al. | |
| 2022/0294104 A1 | 9/2022 | Ortiz et al. | |
| 2022/0302580 A1 | 9/2022 | Ortiz et al. | |
| 2022/0320721 A1 | 10/2022 | Gibson et al. | |
| 2023/0092513 A1 | 3/2023 | Gibson et al. | |
| 2023/0108605 A1 | 4/2023 | Hyland et al. | |
| 2023/0184617 A1 | 6/2023 | Gibson et al. | |
| 2023/0352825 A1 | 11/2023 | Ortiz et al. | |
| 2024/0369438 A1 | 11/2024 | Gibson et al. | |
| 2024/0392543 A1 | 11/2024 | Gibson et al. | |
| 2025/0158273 A1 | 5/2025 | Gibson et al. | |

FOREIGN PATENT DOCUMENTS

| | | |
|---|---|---|
| AU | 2017248541 | 3/2019 |
| CA | 2154433 | 1/1997 |
| CA | 2397174 | 8/2008 |
| CA | 2634739 | 6/2015 |
| CA | 3010333 | 7/2020 |
| CA | 2766850 | 8/2020 |
| CA | 3023529 | 8/2020 |
| CA | 2904466 | 9/2020 |
| CA | 3070690 | 11/2020 |
| CA | 2842042 | 1/2021 |
| CA | 3057167 | 3/2021 |
| CA | 3057202 | 5/2021 |
| CA | 3060512 | 6/2021 |
| CA | 3010345 | 7/2021 |
| CA | 3095465 | 9/2022 |
| CA | 3116787 | 7/2023 |
| CA | 3113517 | 8/2023 |
| CA | 3119150 | 8/2023 |
| CA | 3102529 | 9/2023 |
| CA | 3057224 | 10/2023 |
| CA | 3105683 | 10/2023 |
| CN | 1831478 | 6/2013 |
| DE | 4211038 | 10/1993 |
| DE | 19757581 | 7/1998 |
| EP | 0711986 | 5/1996 |
| EP | 1052492 | 11/2000 |
| EP | 1077370 | 2/2001 |
| EP | 1077371 | 2/2001 |
| EP | 3002577 | 1/2018 |
| EP | 3293315 | 3/2018 |
| EP | 3449062 | 6/2023 |
| EP | 3837400 | 7/2024 |
| FR | 2439990 | 5/1980 |
| FR | 2776065 | 9/1999 |
| GB | 2250820 | 6/1992 |
| GB | 2269900 | 2/1994 |
| GB | 2367362 | 4/2002 |
| GB | 2421311 | 6/2006 |
| GB | 2550908 | 12/2017 |
| JP | 59170739 | 9/1984 |
| JP | 60111132 | 6/1985 |
| JP | 08250777 | 9/1996 |
| JP | H10-2744 | 1/1998 |
| JP | 11201859 | 7/1999 |
| JP | H11210028 | 8/1999 |
| JP | 2000131179 | 5/2000 |
| JP | 2002206965 | 7/2002 |
| JP | 2002310840 | 10/2002 |
| JP | 3595856 | 12/2004 |

(56) References Cited

FOREIGN PATENT DOCUMENTS

| JP | 2005315663 | 11/2005 |
|----|-----------|---------|
| JP | 2005321935 | 11/2005 |
| JP | 2006062414 | 3/2006 |
| JP | 2006062716 | 3/2006 |
| JP | 2007047139 | 2/2007 |
| JP | 2007300426 | 11/2007 |
| JP | 2010068017 | 3/2010 |
| JP | 2013528732 | 7/2013 |
| JP | H5654124 | 11/2014 |
| KR | 101785664 | 11/2017 |
| TW | 201117974 | 6/2011 |
| WO | 9850771 | 11/1998 |
| WO | 0151904 | 7/2001 |
| WO | 03049528 | 6/2003 |
| WO | 2004073115 | 8/2004 |
| WO | 2005052573 | 6/2005 |
| WO | 2008047159 | 4/2008 |
| WO | 2009057214 | 5/2009 |
| WO | 2010135587 | 11/2010 |
| WO | 2011021039 | 2/2011 |
| WO | 2011058561 | 5/2011 |
| WO | 2011159403 | 12/2011 |
| WO | 2012000088 | 1/2012 |
| WO | 2012153147 | 11/2012 |
| WO | 2014016625 | 1/2014 |
| WO | 2014046237 | 3/2014 |
| WO | 2017139029 | 8/2017 |
| WO | 2017139030 | 8/2017 |
| WO | 2020050946 | 3/2020 |
| WO | 2021231163 | 11/2021 |

OTHER PUBLICATIONS

US 11,309,624 B2, 04/2022, Gibson et al. (withdrawn)
US 11,378,481 B2, 07/2022, Gibson et al. (withdrawn)
US 11,378,482 B2, 07/2022, Gibson et al. (withdrawn)
US 11,404,772 B2, 08/2022, Ortiz et al. (withdrawn)
US 11,495,879 B2, 11/2022, Ortiz et al. (withdrawn)
US 11,554,278 B2, 01/2023, Hyland et al. (withdrawn)
US 11,621,483 B2, 04/2023, Ortiz et al. (withdrawn)
Fleury, Jr., Leo W.; Office Action for Canadian patent application No. 3,161,913, filed Aug. 10, 2012, mailed Jun. 17, 2024, 3 pgs.
Ortiz, Jorge Isaac; Final Office Action for U.S. Appl. No. 17/245,181, filed Apr. 30, 2021, mailed Dec. 7, 2021, 28 pgs.
Ortiz, Jorge Isaac; Non-Final Office Action for U.S. Appl. No. 17/245,181, filed Apr. 30, 2021, mailed Sep. 16, 2021, 82 pgs.
Ortiz, Jorge Isaac; Notice of Allowance for U.S. Appl. No. 17/245,181, filed Apr. 30, 2021, mailed Mar. 7, 2022, 13 pgs.
Ortiz, Jorge Isaac; Notice of Allowance for U.S. Appl. No. 17/245,181, filed Apr. 30, 2021, mailed Sep. 19, 2022, 11 pgs.
Sansei Denki KK; Translation for JP3595856(B2), published on Dec. 2, 2004, 12 pgs.
Wallace & Tiernan; Brochure for Hydraclam continuous water quality monitoring via hydrants, Allegedly Available as Early as 2008, 3 pgs.
Wallace & Tiernan; Brochure for HYDRACLAM Distribution Water Quality Monitoring SB.50.700GE, Allegedly Available as Early as 2008, 8 pgs.
Wallace & Tiernan; Product Sheet for Wallace & Tiernan Analysers and Controllers-HydraClam Water Quality Monitor with Remote Communications, Allegedly Available as Early as 2008, 4 pgs.
Ortiz, Jorge Isaac; Non-Final Office Action for U.S. Appl. No. 17/833,230, filed Jun. 6, 2022, mailed Oct. 25, 2022, 98 pgs.
Ortiz, Jorge Isaac; Non-Final Office Action for U.S. Appl. No. 17/829,759, filed Jun. 1, 2022, mailed Oct. 24, 2022, 92 pgs.
Zusman, George V.; Office Action for Canadian patent application No. 2,904,466, filed Sep. 18, 2015, mailed Dec. 30, 2019, 7 pgs.
Zusman, George V.; Extended European Search Report for serial No. 15188004.4, filed Oct. 1, 2015, mailed Feb. 22, 2016, 9 pgs.
Ortiz, Jorge Isaac; International Preliminary Report on Patentability for PCT Application No. PCT/US2016/067689, filed Dec. 20, 2016, mailed Aug. 23, 2018, 8 pgs.

Ortiz, Jorge; International Search Report and Written Opinion for PCT/US16/67689, filed Dec. 20, 2016, mailed Mar. 8, 2017, 9 pgs.
Ortiz, Jorge Isaac; Extended European Search Report for serial No. 16890114.8, filed Dec. 20, 2016, mailed Sep. 26, 2019, 11 pgs.
Ortiz, Jorge Isaac; Office Action for European patent application No. 16890114.8, filed Dec. 20, 2016, mailed Oct. 4, 2021, 7 pgs.
Ortiz, Jorge Isaac; Office Action for Canadian patent application No. 3,010,333, filed Dec. 20, 2016, mailed Dec. 6, 2019, 4 pgs.
Oritz, Jorge Isaac; Office Action for Canadian patent application No. 3,070,690, filed Dec. 20, 2016, mailed Mar. 10, 2020, 3 pgs.
Ortiz, Jorge Isaac; Office Action for Canadian patent application No. 3,095,465, filed Dec. 20, 2016, mailed Nov. 8, 2021, 4 pgs.
Gibson, Daryl Lee; Corrected Notice of Allowance for U.S. Appl. No. 15/255,795, filed Sep. 2, 2016, mailed Mar. 21, 2019, 6 pgs.
Gibson, Daryl Lee; Final Office Action for U.S. Appl. No. 15/255,795, filed Sep. 2, 2016, mailed Aug. 31, 2018, 33 pgs.
Gibson, Daryl Lee; Non-Final Office Action for U.S. Appl. No. 15/255,795, filed Sep. 2, 2016, mailed Feb. 23, 2018, 86 pgs.
Gibson, Daryl Lee; Notice of Allowance for U.S. Appl. No. 15/255,795, filed Sep. 2, 2016, mailed Jan. 17, 2019, 17 pgs.
Gibson, Daryl Lee; Final Office Action for U.S. Appl. No. 16/352,045, filed Mar. 13, 2019, mailed May 4, 2021, 33 pgs.
Gibson, Daryl Lee; Non-Final Office Action for U.S. Appl. No. 16/352,045, filed Mar. 13, 2019, mailed Nov. 25, 2020, 106 pgs.
Gibson, Daryl Lee; Non-Final Office Action for U.S. Appl. No. 16/352,045, filed Mar. 13, 2019, mailed Aug. 13, 2021, 20 pgs.
Gibson, Daryl Lee; Notice of Allowance for U.S. Appl. No. 16/352,045, filed Mar. 13, 2019, mailed Dec. 1, 2021, 24 pgs.
Gibson, Daryl Lee; Non-Final Office Action for U.S. Appl. No. 17/683,090, filed Feb. 28, 2022, mailed Dec. 13, 2022, 101 pgs.
Gibson, Daryl Lee; Requirement for Restriction/Election for U.S. Appl. No. 17/683,090, filed Feb. 28, 2022, mailed Nov. 9, 2022, 5 pgs.
Gibson, Daryl Lee; Applicant-Initiated Interview Summary for U.S. Appl. No. 16/234,715, filed Dec. 28, 2018, mailed Oct. 14, 2021, 2 pgs.
Gibson, Daryl Lee; Final Office Action for U.S. Appl. No. 16/234,715, filed Dec. 28, 2018, mailed Aug. 5, 2021, 21 pgs.
Gibson, Daryl Lee; Non-Final Office Action for U.S. Appl. No. 16/234,715, filed Dec. 28, 2018, mailed Jan. 1, 2021, 105 pgs.
Gibson, Daryl Lee; Notice of Allowance for U.S. Appl. No. 16/234,715, filed Dec. 28, 2018, mailed Dec. 7, 2021, 23 pgs.
Gibson, Daryl Lee; Corrected Notice of Allowance for U.S. Appl. No. 16/121,136, filed Sep. 4, 2018, mailed Nov. 9, 2020, 6 pgs.
Gibson, Daryl Lee; Non-Final Office Action for U.S. Appl. No. 16/121,136, filed Sep. 4, 2018, mailed Jun. 22, 2020, 94 pgs.
Gibson, Daryl Lee; Notice of Allowance for U.S. Appl. No. 16/121,136, filed Sep. 4, 2018, mailed Sep. 29, 2020, 15 pgs.
Gibson, Daryl Lee; Requirement for Restriction/Election for U.S. Appl. No. 16/121,136, filed Sep. 14, 2018, mailed May 7, 2020, 5 pgs.
Gibson, Daryl Lee; Applicant-Initiated Interview Summary for U.S. Appl. No. 17/079,642, filed Oct. 26, 2020, mailed Feb. 9, 2022, 2 pgs.
Gibson, Daryl Lee; Final Office Action for U.S. Appl. No. 17/079,642, filed Oct. 26, 2020, mailed Dec. 14, 2021, 17 pgs.
Gibson, Daryl Lee; Non-Final Office Action for U.S. Appl. No. 17/079,642, filed Oct. 26, 2020, mailed Aug. 30, 2021, 84 pgs.
Gibson, Daryl Lee; Notice of Allowance for U.S. Appl. No. 17/079,642, filed Oct. 26, 2020, mailed Mar. 1, 2022, 11 pgs.
ABT, Inc., Installation Instructions Belleville Washer springs (Year: 2014), 1 pg.
Gibson, Daryl Lee; Non-Final Office Action for U.S. Appl. No. 16/428,744, filed May 31, 2019, mailed Mar. 2, 2021, 121 pgs.
Gibson, Daryl Lee; Notice of Allowance for U.S. Appl. No. 16/428,744, filed May 31, 2019, mailed Mar. 16, 2022, 34 pgs.
Gibson, Daryl Lee; Notice of Allowance for U.S. Appl. No. 16/428,744, filed May 31, 2019, mailed Sep. 14, 2022, 12 pgs.
QRFS, Storz FDCs and fire Hydrant Storz connections: Adapters or integral Storz, Mar. 2019 (Year: 2019), 21 pgs.
Speacialinsert, Inserts for plastic (Year: 2016), 36 pgs.

(56) References Cited

OTHER PUBLICATIONS

Gibson, Daryl Lee; Applicant-Initiated Interview Summary for U.S. Appl. No. 17/245,419, filed Apr. 30, 2021, mailed Dec. 2, 2021, 2 pgs.

Gibson, Daryl Lee; Applicant-Initiated Interview Summary for U.S. Appl. No. 17/245,419, filed Jan. 30, 2021, mailed Mar. 8, 2022, 2 pgs.

Gibson, Daryl Lee; Final Office Action for U.S. Appl. No. 17/245,419, filed Apr. 30, 2021, mailed Oct. 25, 2021, 27 pgs.

Fleury, Jr., Leo W.; Office Action for Canadian patent application No. 3,161,900, filed Aug. 10, 2012, mailed Aug. 28, 2023, 3 pgs.

Fleury, Jr., Leo W.; Office Action for Canadian patent application No. 3,161,913, filed Aug. 10, 2012, mailed Aug. 22, 2023, 4 pgs.

Ortiz, Jorge Isaac; Office Action for European patent application No. 16890114.8, filed Dec. 20, 2016, mailed Sep. 11, 2023, 7 pgs.

Gibson, Daryl Lee; Non-Final Office Action for U.S. Appl. No. 17/683,127, filed Feb. 28, 2022, mailed Aug. 30, 2023, 121 pgs.

Gibson, Daryl Lee; Office Action for European patent application No. 19857477.4, filed Aug. 7, 2019, mailed Jul. 31, 2023, 3 pgs.

Hyland, Gregory E.; Office Action for Canadian patent application No. 3,177,996, filed Apr. 29, 2020, mailed Apr. 9, 2024, 4 pgs.

Gibson, Daryl Lee; Notice of Allowance for U.S. Appl. No. 18/106,190, filed Feb. 6, 2023, mailed Apr. 12, 2024. 13 pgs.

Gibson, Daryl Lee; Office Action for Canadian patent application No. 3,177,216, filed Dec. 20, 2016, mailed Apr. 2, 2024, 5 pgs.

Gibson, Daryl Lee; Notice of Allowance for U.S. Appl. No. 18/071,359, filed Nov. 29, 2022, mailed May 14, 2024, 17 pgs.

Ortiz, Jorge Isaac; Office Action for Canadian patent application No. 3,168,445, filed Dec. 20, 2016, mailed Sep. 22, 2023, 4 pgs.

Ortiz, Jorge Isaac; Office Action for Canadian patent application No. 3,168,447, filed Dec. 20, 2016, mailed Sep. 25, 2023, 4 pgs.

Gibson, Daryl Lee; Non-Final Office Action for U.S. Appl. No. 17/683,090, filed Feb. 28, 2022, mailed Aug. 2, 2023, 23 pgs.

Ortiz, Jorge Isaac; Notice of Allowance for U.S. Appl. No. 17/833,230, filed Jun. 6, 2022, mailed Apr. 10, 2023, 7 pgs.

Gibson, Daryl Lee; Final Office Action for U.S. Appl. No. 17/683,090, filed Feb. 28, 2022, mailed Mar. 8, 2023, 16 pgs.

Gibson, Daryl Lee; Notice of Allowance for U.S. Appl. No. 17/827,468, filed May 27, 2022, mailed May 15, 2023, 99 pgs.

Gibson, Daryl Lee; Extended European Search Report for application No. 23154819.9, filed Dec. 20, 2016, mailed Apr. 28, 2023, 16 pgs.

Gibson, Daryl Lee; Office Action for European patent application No. 21180958.7, filed Aug. 7, 2019, mailed Apr. 26, 2023, 4 pgs.

Fleury Jr., Leo W.; Notice of Allowance for U.S. Appl. No. 17/536,292, filed Nov. 29, 2021, mailed Feb. 28, 2023, 108 pgs.

Ortiz, Jorge Isaac; Final Office Action for U.S. Appl. No. 17/833,230, filed Jun. 6, 2022, mailed Feb. 10, 2023, 30 pgs.

Ortiz, Jorge Isaac; Notice of Allowance for U.S. Appl. No. 17/829,759, filed Jun. 1, 2022, mailed Feb. 15, 2023, 17 pgs.

Gibson, Daryl Lee; Notice of Allowance for U.S. Appl. No. 17/245,419, filed Apr. 30, 2021, mailed Feb. 23, 2023, 15 pgs.

Hyland, Gregory E.; Final Office Action for U.S. Appl. No. 18/070,154, filed Nov. 28, 2022, mailed Sep. 30, 2024, 30 pgs.

Gibson, Daryl Lee; Notice of Allowance for U.S. Appl. No. 17/683,090, filed Feb. 28, 2022, mailed Sep. 26, 2024, 17 pgs.

Gibson, Daryl Lee; Non-Final Office Action for U.S. Appl. No. 17/683,127, filed Feb. 28, 2022, mailed Oct. 16, 2024, 30 pgs.

Tan, John; Notice of Eligibility and Examination Report for Singapore Patent Application No. 10202105366P, filed Aug. 7, 2019, mailed Nov. 15, 2024, 4 pgs.

Hyland, Gregory E.; Non-Final Office Action for U.S. Appl. No. 18/070,154, filed Nov. 28, 2022, mailed Feb. 11, 2025, 30 pgs.

Hyland, Gregory E., Non-Final Office Action for U.S. Appl. No. 13/101,235, filed May 5, 2011, mailed Jul. 31, 2013; 57 pgs.

Hyland, Gregory E.; Final Office Action for U.S. Appl. No. 13/101,235, filed May 5, 2011, mailed Feb. 20, 2014; 29 pgs.

Hyland, Gregory E.; Issue Notification for U.S. Appl. No. 13/101,235, filed May 5, 2011, mailed Dec. 23, 2014, 1 pg.

Hyland, Gregory E.; Non-Final Office Action for U.S. Appl. No. 13/101,235, filed May 5, 2011, mailed Jun. 5, 2014, 29 pgs.

Hyland, Gregory E.; Notice of Allowance for U.S. Appl. No. 13/101,235, filed May 5, 2011, mailed Sep. 11, 2014, 11 pgs.

Hyland, Gregory E.; Supplemental Notice of Allowability for U.S. Appl. No. 13/101,235, filed May 5, 2011, mailed Nov. 25, 2014, 5 pgs.

Hyland, Gregory E.; Applicant-Initiated Interview Summary for U.S. Appl. No. 14/557,754, filed Dec. 2, 2014, mailed Apr. 19, 2017, 4 pgs.

Hyland, Gregory E.; Final Office Action for U.S. Appl. No. 14/557,754, filed Dec. 2, 2014, mailed Apr. 5, 2017, 23 pgs.

Hyland, Gregory E.; Final Office Action for U.S. Appl. No. 14/557,754, filed Dec. 2, 2014, mailed Jun. 30, 2016, 24 pgs.

Hyland, Gregory E.; Non-Final Office Action for U.S. Appl. No. 14/557,754, filed Dec. 2, 2014, mailed Jan. 19, 2016, 101 pgs.

Hyland, Gregory E.; Non-Final Office Action for U.S. Appl. No. 14/557,754, filed Dec. 2, 2014, mailed Nov. 8, 2016, 48 pgs.

Hyland, Gregory E.; Notice of Allowance for U.S. Appl. No. 14/557,754, filed Dec. 2, 2014, mailed Jul. 17, 2017, 14 pgs.

Hyland, Gregory E.; Notice of Decision from Post-Prosecution Pilot Program (P3) Conference for U.S. Appl. No. 14/557,754, filed Dec. 2, 2014, mailed Sep. 14, 2016, 4 pgs.

Hyland, Gregory E.; Supplemental Notice of Allowability for U.S. Appl. No. 14/557,754, filed Dec. 2, 2014, mailed Oct. 20, 2017, 11 pgs.

Hyland, Gregory; Issue Notification for U.S. Appl. No. 14/557,754, filed Dec. 2, 2014, mailed Dec. 20, 2017, 1 pg.

Hyland, Gregory E.; Final Office Action for U.S. Appl. No. 14/848,676, filed Sep. 9, 2015, mailed Aug. 19, 2016; 20 pgs.

Hyland, Gregory E.; Issue Notification for U.S. Appl. No. 14/848,676, filed Sep. 9, 2015, mailed Dec. 6, 2017, 1 pg.

Hyland, Gregory E.; Non-Final Office Action for U.S. Appl. No. 14/848,676, filed Sep. 9, 2015, mailed Dec. 13, 2016, 52 pgs.

Hyland, Gregory E.; Notice of Allowance for U.S. Appl. No. 14/848,676, filed Sep. 9, 2015, mailed Sep. 6, 2017, 12 pgs.

Hyland, Gregory E.; Supplemental Notice of Allowability for U.S. Appl. No. 14/848,676, filed Sep. 9, 2015, mailed Nov. 27, 2017, 6 pgs.

Hyland, Gregory E.; Supplemental Notice of Allowability for U.S. Appl. No. 14/848,676, filed Sep. 9, 2015, mailed Sep. 19, 2017, 8 pgs.

Hyland, Gregory; Final Office Action for U.S. Appl. No. 14/848,676, filed Sep. 9, 2015, mailed Jun. 7, 2017, 25 pgs.

Hyland, Gregory; Non-Final Office Action for U.S. Appl. No. 14/848,676, filed Sep. 9, 2015, mailed Mar. 4, 2016, 94 pgs.

Hyland, Gregory E.; Final Office Action for U.S. Appl. No. 15/817,172, filed Nov. 18, 2017, mailed Jun. 11, 2020, 33 pgs.

Hyland, Gregory E.; Non-Final Office Action for U.S. Appl. No. 15/817,172, filed Nov. 18, 2017, mailed Dec. 17, 2019, 23 pgs.

Hyland, Gregory E.; Non-Final Office Action for U.S. Appl. No. 15/817,172, filed Nov. 18, 2017, mailed Jul. 10, 2019, 74 pgs.

Hyland, Gregory E.; Notice of Allowance for U.S. Appl. No. 15/817,172, filed Nov. 18, 2017, mailed Aug. 21, 2020, 9 pgs.

Hyland, Gregory E.; Supplemental Notice of Allowance for U.S. Appl. No. 15/817,172, filed Nov. 18, 2017, mailed Oct. 28, 2020, 4 pgs.

Hyland, Gregory E.; Supplemental Notice of Allowance for U.S. Appl. No. 15/817,172, filed Nov. 18, 2017, mailed Dec. 7, 2020, 4 pgs.

Hyland, Gregory; Supplemental Notice of Allowance for U.S. Appl. No. 15/817,172, filed Nov. 18, 2017, mailed Oct. 9, 2020, 4 pgs.

Hyland, Gregory E.; Final Office Action for U.S. Appl. No. 16/675,507, filed Nov. 6, 2019, mailed Jun. 26, 2020, 70 pgs.

Hyland, Gregory E.; Non-Final Office Action for U.S. Appl. No. 16/675,507, filed Nov. 6, 2019, mailed Jan. 28, 2020, 18 pgs.

Hyland, Gregory E.; Notice of Allowance for U.S. Appl. No. 16/675,507, filed Nov. 6, 2019, mailed Oct. 23, 2020, 16 pgs.

Hyland, Gregory E.; Supplemental Notice of Allowance for U.S. Appl. No. 16/675,507, filed Nov. 6, 2019, mailed Nov. 10, 2020, 4 pgs.

Hyland, Gregory E.; Non-Final Office Action for U.S. Appl. No. 17/071,632, filed Oct. 15, 2020, mailed Mar. 30, 2022, 89 pgs.

(56) References Cited

OTHER PUBLICATIONS

Hyland, Gregory E.; Notice of Allowance for U.S. Appl. No. 17/071,632, filed Oct. 15, 2020, mailed Jun. 24, 2022, 11 pgs.
Hyland, Gregory E.; Notice of Allowance for U.S. Appl. No. 17/071,632, filed Oct. 15, 2020, mailed Aug. 29, 2022, 10 pgs.
Fleury Jr., Leo W.; Non-Final Office Action for U.S. Appl. No. 13/492,790, filed Jun. 8, 2012, mailed Nov. 5, 2014, 30 pgs.
Fleury, Jr., Leo W.; Advisory Action for U.S. Appl. No. 13/492,790, filed Jun. 8, 2012, mailed Jul. 9, 2014, 3 pgs.
Fleury, Jr., Leo W.; Final Office Action for U.S. Appl. No. 13/492,790, filed Jun. 8, 2012, mailed Mar. 12, 2014; 19 pgs.
Fleury, Jr., Leo W.; Issue Notification for U.S. Appl. No. 13/492,790, filed Jun. 8, 2012, mailed Mar. 2, 2016, 1 pg.
Fleury, Jr., Leo W.; Non-Final Office Action for U.S. Appl. No. 13/492,790, filed Jun. 8, 2012, mailed Sep. 12, 2013; 37 pgs.
Fleury, Jr., Leo W.; Notice of Allowance for U.S. Appl. No. 13/492,790, filed Jun. 8, 2012, mailed Feb. 2, 2016, 9 pgs.
Fleury, Jr., Leo W.; Notice of Allowance for U.S. Appl. No. 13/492,790, filed Jun. 8, 2012, mailed May 12, 2015, 9 pgs.
Fleury, Jr., Leo W.; Notice of Allowance for U.S. Appl. No. 13/492,790, filed Jun. 8, 2012, mailed Sep. 23, 2015, 11 pgs.
Fleury, Leo W.; Applicant-Initiated Interview Summary for U.S. Appl. No. 14/870,070, filed Sep. 30, 2015, mailed Feb. 28, 2018, 4 pgs.
Fleury, Leo W.; Final Office Action for U.S. Appl. No. 14/870,070, filed Sep. 30, 2015, mailed Dec. 29, 2017, 24 pgs.
Fleury, Leo; Non-Final Office Action for U.S. Appl. No. 14/870,070, filed Sep. 30, 2015, mailed Jun. 21, 2017, 88 pgs.
Fleury Jr., Leo W.; Advisory Action for U.S. Appl. No. 15/939,942, filed Mar. 29, 2018, mailed Dec. 7, 2021, 2 pgs.
Fleury, Jr., Leo W.; Final Office Action for U.S. Appl. No. 15/939,942, filed Mar. 29, 2018, mailed Nov. 25, 2020, 37 pgs.
Fleury, Jr., Leo W.; Final Office Action for U.S. Appl. No. 15/939,942, filed Mar. 29, 2018, mailed Feb. 19, 2020, 29 pgs.
Fleury, Jr., Leo W.; Non-Final Office Action for U.S. Appl. No. 15/939,942, filed Mar. 29, 2018, mailed Mar. 24, 2021, 32 pgs.
Fleury, Jr., Leo W.; Non-Final Office Action for U.S. Appl. No. 15/939,942, filed Mar. 29, 2018, mailed May 27, 2020, 23 pgs.
Fleury, Jr., Leo W.; Non-Final Office Action for U.S. Appl. No. 15/939,942, filed Mar. 29, 2018, mailed Sep. 25, 2019, 92 pgs.
Fleury Jr., Leo W.; Final Office Action for U.S. Patent Application No. 15.939,942, filed Mar. 29, 2018, mailed Mar. 27, 2021, 30 pgs.
Richarz, Werner Guenther; Corrected Notice of Allowability for U.S. Appl. No. 13/492,792, filed Jun. 8, 2012, mailed Aug. 29, 2017, 6 pgs.
Richarz, Werner Guenther; Final Office Action for U.S. Appl. No. 13/492,792, filed Jun. 8, 2012, mailed Oct. 20, 2014, 17 pgs.
Richarz, Werner Guenther, Final Office Action for U.S. Appl. No. 13/492,792, filed Jun. 8, 2012, mailed Sep. 10, 2015, 20 pgs.
Richarz, Werner Guenther, Final Office Action for U.S. Appl. No. 13/492,792, filed Jun. 8, 2012, mailed Sep. 8, 2016, 36 pgs.
Richarz, Werner Guenther; Issue Notification for U.S. Appl. No. 13/492,792, filed Jun. 8, 2012, mailed Sep. 6, 2017, 1 pg.
Richarz, Werner Guenther; Non-Final Office Action for U.S. Appl. No. 13/492,792, filed Jun. 8, 2012, mailed Nov. 6, 2013, 39 pgs.
Richarz, Werner Guenther; Non-Final Office Action for U.S. Appl. No. 13/492,792, filed Jun. 8, 2012, mailed Jun. 4, 2014, 24 pgs.
Richarz, Werner Guenther; Non-Final Office Action for U.S. Appl. No. 13/492,792, filed Jun. 8, 2012, mailed Feb. 27, 2015, 15 pgs.
Richarz, Werner Guenther; Non-Final Office Action for U.S. Appl. No. 13/492,792, filed Jun. 8, 2012, mailed Mar. 8, 2016, 27 pgs.
Richarz, Werner Guenther, Notice of Allowance for U.S. Appl. No. 13/492,792, filed Jun. 8, 2012, mailed Jun. 13, 2017, 31 pgs.
Richarz, Werner Guenther; Restriction Requirement for U.S. Appl. No. 13/492,792, filed Jun. 8, 2012, mailed Sep. 27, 2013; 5 pgs.
Chou, et al.; Article entitled: "Non-invasive Acceleration-based Methodology for Damage Detection and Assessment of Water Distribution System", Mar. 2010, 17 pgs.

Dintakurti, Ganapathi Deva Varma; Corrected Notice of Allowance for U.S. Appl. No. 13/492,794, filed Jun. 8, 2012, mailed Dec. 6, 2018, 6 pgs.
Dintakurti, Ganapathi Deva Varma; Final Office Action for U.S. Appl. No. 13/492,794, filed Jun. 8, 2012, mailed Oct. 18, 2017, 38 pgs.
Dintakurti, Ganapathi Deva Varma; Final Office Action for U.S. Appl. No. 13/492,794, filed Jun. 8, 2012, mailed Nov. 8, 2016, 31 pgs.
Dintakurti, Ganapathi Deva Varma; Final Office Action for U.S. Appl. No. 13/492,794, filed Jun. 8, 2012, mailed Jun. 22, 2018, 39 pgs.
Dintakurti, Ganapathi Deva Varma; Issue Notification for U.S. Appl. No. 13/492,794, filed Jun. 8, 2012, mailed Dec. 19, 2018, 1 pg.
Dintakurti, Ganapathi Deva Varma; Non-Final Office Action for U.S. Appl. No. 13/492,794, filed Jun. 8, 2012, mailed Mar. 16, 2017, 30 pgs.
Dintakurti, Ganapathi Deva Varma; Non-Final Office Action for U.S. Appl. No. 13/492,794, filed Jun. 8, 2012, mailed May 17, 2016, 48 pgs.
Dintakurti, Ganapathi Deva Varma; Non-Final Office Action for U.S. Appl. No. 13/492,794, filed Jun. 8, 2012, mailed Jan. 11, 2018, 38 pgs.
Dintakurti, Ganapathi Deva Varma; Non-Final Office Action for U.S. Appl. No. 13/492,794, filed Jun. 8, 2012, mailed Jan. 16, 2015, 60 pgs.
Dintakurti, Ganapathi Deva Varma; Notice of Allowance for U.S. Appl. No. 13/492,794, filed Jun. 8, 2012, mailed Sep. 24, 2018, 21 pgs.
Fleury Jr, Leo W.; Non-Final Office Action for U.S. Appl. No. 13/492,795, filed Jun. 8, 2012, mailed Sep. 23, 2013; 35 pgs.
Fleury, Jr., Leo W.; Advisory Action for U.S. Appl. No. 13/492,795, filed Jun. 8, 2012, mailed Jun. 18, 2014, 4 ogs.
Fleury, Jr., Leo W.; Advisory Action for U.S. Appl. No. 13/492,795, filed Jun. 8, 2012, mailed Sep. 9, 2015, 3 pgs.
Fleury, Jr., Leo W.; Corrected Notice of Allowability for U.S. Appl. No. 13/492,795, filed Jun. 8, 2012, mailed Feb. 14, 2017; 8 pgs.
Fleury, Jr., Leo W.; Final Office Action for U.S. Appl. No. 13/492,795, filed Jun. 8, 2012, mailed Apr. 23, 2014, 19 pgs.
Fleury, Jr., Leo W.; Final Office Action for U.S. Appl. No. 13/492,795, filed Jun. 8, 2012, mailed May 22, 2015, 28 pgs.
Fleury, Jr., Leo W.; Issue Notification for U.S. Appl. No. 13/492,795, filed Jun. 8, 2012, mailed Feb. 22, 2017; 1 page.
Fleury, Jr., Leo W.; Non-Final Office Action for U.S. Appl. No. 13/492,795, filed Jun. 8, 2012, mailed Oct. 21, 2014, 37 pgs.
Fleury, Jr., Leo W.; Non-Final Office Action for U.S. Appl. No. 13/492,795, filed Jun. 8, 2012, mailed Mar. 1, 2016, 42 pgs.
Fleury, Jr., Leo W.; Notice of Allowability for U.S. Appl. No. 13/492,795, filed Jun. 8, 2012, mailed Oct. 24, 2016, 13 pgs.
Fleury, Jr., Leo W.; Notice of Allowance for U.S. Appl. No. 13/492,795, filed Jun. 8, 2012, mailed Sep. 21, 2016, 18 pgs.
Fleury, Jr., Leo W.; Supplemental Notice of Allowance for U.S. Appl. No. 13/492,795, filed Jun. 8, 2012, mailed Nov. 22, 2016; 8 pgs.
Fleury, Jr., Leo W.; Corrected Notice of Allowance for U.S. Appl. No. 15/401,457, filed Jan. 9, 2017, mailed Jun. 26, 2019, 55 pgs.
Fleury, Jr., Leo W.; Notice of Allowance for U.S. Appl. No. 15/401,457, filed Jan. 9, 2017, mailed Apr. 16, 2019, 88 pgs.
Fleury Jr., Leo W.; Final Office Action for U.S. Appl. No. 16/453,318, filed Jun. 26, 2019, mailed Aug. 8, 2022, 53 pgs.
Fleury Jr., Leo W.; Notice of Allowance for U.S. Appl. No. 16/453,318, filed Jun. 26, 2019, mailed Oct. 25, 2022, 43 pgs.
Fleury Jr., Leo W.; Notice of Allowance for U.S. Appl. No. 16/453,318, filed Jun. 26, 2019, mailed Dec. 5, 2022, 146 pgs.
Fleury, Jr.; Non-Final Office Action for U.S. Appl. No. 16/453,318, filed Jun. 26, 2019, mailed Mar. 2, 2022, 129 pgs.
Hyland; International Preliminary Report on Patentability for serial No. PCT/US2011/035374, filed May 5, 2011, mailed Dec. 19, 2012; 5 pgs.
Hyland; International Search Report and Written Opinion for serial No. PCT/US2011/035374, filed May 5, 2011, mailed Sep. 13, 2011; 7 pgs.

(56) References Cited

OTHER PUBLICATIONS

Hyland, Gregory E..; Office Action for Canadian Patent Application No. 2,766,850, filed May 5, 2011, mailed Mar. 13, 2017, 4 pgs.

Hyland, Gregory E.; Office Action for Canadian application No. 2,766,850, filed May 5, 2011, mailed Aug. 16, 2018, 4 pgs.

Hyland, Gregory E.; Office Action for Canadian patent application No. 2,766,850, filed May 5, 2011, mailed Jun. 19, 2019, 4 pgs.

Hyland, Gregory E.; Non-Final Office Action of U.S. Appl. No. 18/070,154, filed Nov. 28, 2022, mailed Mar. 27, 2024, 105 pgs.

Fleury, Leo W. Jr.; Office Action for Canadian patent application No. 3,161,904, filed Aug. 10, 2012, mailed Aug. 22, 2023, 4 pgs.

Gibson, Daryl Lee; Final Office Action for U.S. Appl. No. 17/683,090, filed Feb. 28, 2022, mailed Mar. 29, 2024, 18 pgs.

Hyland, Gregory E.; Mexico Office Action for serial No. MX/a/2012/000347, filed May 5, 2011, mailed Dec. 13, 2016, 5 pgs.

Hyland, Gregory E.; Mexico Office Action for serial No. MX/a/2012/000347, filed May 5, 2011, mailed May 30, 2016, 4 pgs.

Hyland, Gregory E.; Office Action for European patent application No. 11796120.1, filed May 5, 2011, mailed Feb. 9, 2018, 4 pgs.

Hyland, Gregory; Extended European Search Report for serial No. 11796120.1, filed May 5, 2011, mailed Nov. 4, 2016, 8 pgs.

Hyland, Gregory E.; Australian Patent Examination Report for serial No. 2011265675, filed Jan. 21, 2012, mailed Oct. 1, 2014, 3 pgs.

Hyland, Gregory E.; Japanese Office Action for serial No. 2013515338, filed Jan. 30, 2012, mailed Jun. 10, 2014, 8 pgs.

Hyland, Gregory E.; Japanese Office Action for serial No. 2014-234642, filed May 5, 2011, mailed Nov. 4, 2015,9 pgs.

Hyland, Gregory E.; Japanese Office Action for serial No. 2014-234642, filed May 5, 2011, mailed Jul. 7, 2015, 9 pgs.

Hyland, Gregory E.; Australian Examination Report for serial No. 2015202550, filed May 5, 2011, mailed Feb. 9, 2017, 4 bgs.

Hyland, Gregory E.; Australian Examination Report for Serial No. 2015202550, filed May 5, 2011, mailed May 16, 2017, 5 pgs.

Hyland, Gregory E.; Australian Examination Report for Serial No. 2015202550, filed May 5, 2011, mailed Jul. 5, 2017, 4 pgs.

Hyland, Gregory E.; Mexico Office Action for serial No. MX/a/2012/000347, filed May 5, 2011, mailed Aug. 31, 2016, 4 pgs.

Hyland, Gregory E.; Australian Examination Report for serial No. 2015202550, filed May 5, 2011, mailed Aug. 12, 2016, 4 pgs.

Hyland, Gregory E.; Office Action for Mexico Patent Application No. MX/a/2017/006090, filed May 5, 2011, mailed Sep. 26, 2018, 4 pgs.

Hyland, Gregory E.; Examination Report for Australian patent application No. 2017248541, filed Oct. 20, 2017, mailed Apr. 20, 2018, 5 pgs.

Hyland, Gregory E.; Office Action for Canadian patent application No. 3,023,529, filed May 5, 2011, mailed Nov. 26, 2019, 4 pgs.

Keefe, Robert Paul, Office Action for Canadian application No. 3,060,512, filed May 5, 2011, mailed Apr. 22, 2020, 5 pgs.

Keefe, Robert Paul, Office Action for Canadian application No. 3,060,512, filed May 5, 2011, mailed Jul. 13, 2020, 6 pgs.

Hyland, Gregory E.; Office Action for Canadian patent application No. 3,116,787, filed Apr. 29, 2020, mailed Aug. 15, 2022, 4 pgs.

Fleury, Leo W.; International Preliminary Report on Patentability for serial No. PCT/US12/50390 filed Aug. 10, 2012, mailed Feb. 18, 2014, 14 pgs.

Fleury Jr., Leo W.; European Search Report for U.S. Appl. No. 12/823,594, filed Aug. 10, 2012, mailed Dec. 21, 2017, 4 pgs.

Fleury Jr., Leo W.; European Search Report for U.S. Appl. No. 12/823,594, filed Aug. 10, 2012, mailed May 10, 2017, 4 pgs.

Fleury, Leo W.; International Search Report and Written Opinion for serial No. PCT/US12/50390 filed Aug. 10, 2012, mailed Dec. 17, 2012, 18 pgs.

Fleury Jr., Leo W.; European Search Report for U.S. Appl. No. 12/823,594, filed Aug. 10, 2012, mailed Jun. 8, 2015, 11 pgs.

Fleury, Leo W.; Office Action for Canadian application No. 2,842,042, filed Aug. 10, 2012, mailed Feb. 28, 2019, 3 pgs.

Fleury, Leo W.; Office Action for Canadian application No. 2,842,042, filed Aug. 10, 2012, mailed Apr. 24, 2018, 3 pgs.

Fleury, Leo W.; Office Action for Canadian patent application No. 2,842,042, filed Aug. 10, 2012, mailed Dec. 5, 2019, 3 pgs.

Fleury, Leo W., Jr.; Office Action for Canadian patent application No. 3,102,529, filed Aug. 10, 2012, mailed Oct. 25, 2022, 4 pgs.

Fleury, Leo W., Jr.; Office Action for Canadian patent application No. 3,102,529, filed Aug. 10, 2012, mailed Mar. 16, 2022, 4 pgs.

Ortiz, Jorge Isaac; Requirement for Restriction/Election for U.S. Appl. No. 17/245,181, filed Apr. 30, 2021, mailed Jul. 22, 2021, 6 pgs.

Hunaidi, Osama; Issue Notification for U.S. Appl. No. 11/766,288, filed Jun. 21, 2007, mailed Sep. 22, 2010, 1 pg.

Hunaidi, Osama; Non-Final Office Action for U.S. Appl. No. 11/766,288, filed Jun. 21, 2007, mailed Jan. 20, 2010, 50 pgs.

Hunaidi, Osama; Notice of Allowance for U.S. Appl. No. 11/766,288, filed Jun. 21, 2007, mailed Jun. 24, 2010, 8 pgs.

Hunaidi, Osama; Non-final Office Action for U.S. Appl. No. 09/482,317, filed Jan. 14, 2000, mailed Dec. 17, 2001, 6 pgs.

Zusman, George V.; Issue Notification for U.S. Appl. No. 14/503,951, filed Oct. 1, 2014, mailed Dec. 7, 2016, 1 pg.

Zusman, George V.; Notice of Allowance for U.S. Appl. No. 14/503,951, filed Oct. 1, 2014, mailed Sep. 21, 2016, 18 pgs.

Gibson, Daryl Lee; Non-Final Office Action for U.S. Appl. No. 17/683,090, filed Feb. 28, 2022, mailed Dec. 21, 2023, 20 pgs.

Gibson, Daryl Lee; Final Office Action for U.S. Appl. No. 17/683,127, filed Feb. 28, 2022, mailed Jan. 19, 2024, 36 pgs.

ABT, Inc.; Installation Instructions for Belleville washer springs (Year: 2014), 1 pg.

Endeavour Tools; Catalogue for Security fasteners (Year: 2007), 52 pgs.

Gibson, Daryl Lee; Non-Final Office Action for U.S. Appl. No. 18/106,190, filed Feb. 6, 2023, mailed Dec. 13, 2023, 122 pgs.

Gibson, Daryl Lee; Non-Final Office Action for U.S. Appl. No. 18/071,359, filed Nov. 29, 2022, mailed Feb. 8, 2024, 154 pgs.

Gibson, Daryl Lee; Final Office Action for U.S. Appl. No. 17/245,419, filed Apr. 30, 2021, mailed Apr. 8, 2022, 31 pgs.

Gibson, Daryl Lee; Non-Final Office Action for U.S. Appl. No. 17/245,419, filed Apr. 30, 2021, mailed Jan. 14, 2022, 27 pgs.

Gibson, Daryl Lee; Non-Final Office Action for U.S. Appl. No. 17/245,419, filed Apr. 30, 2021, mailed Jul. 20, 2022, 37 pgs.

Gibson, Daryl Lee; Non-Final Office Action for U.S. Appl. No. 17/245,419, filed Apr. 30, 2021, mailed Sep. 2, 2021, 82 pgs.

Gibson, Daryl Lee; Notice of Allowance for U.S. Appl. No. 17/245,419, filed Apr. 30, 2021, mailed Nov. 4, 2022, 22 pgs.

Gibson, Daryl Lee; International Preliminary Report on Patentability for PCT Application No. PCT/US2016/067692, iled Dec. 20, 2016, mailed Aug. 23, 2018, 9 pgs.

Gibson, Daryl Lee; International Search Report and Written Opinion for PCT Application No. PCT/US2016/067692, filed Dec. 20, 2016, mailed Mar. 2, 2017, 10 pgs.

Gibson, Daryl Lee; Extended European Search Report for 16890115.5, filed Dec. 20, 2016, mailed Jan. 24, 2020, 10 pgs.

Gibson, Daryl Lee; Office Action for Canadian patent application No. 3,010,345, filed Dec. 20, 2016, mailed Oct. 6, 2020, 4 pgs.

Gibson, Daryl Lee; Office Action for Canadian patent application No. 3,010,345, filed Dec. 20, 2016, mailed Dec. 16, 2019, 4 pgs.

Gibson, Daryl Lee; Office Action for Canadian patent application No. 3,119,150, filed Dec. 20, 2016, mailed Sep. 15, 2022, 6 pgs.

Gibson, Daryl Lee; Office Action for Canadian patent application No. 3,057,224, filed Oct. 1, 2019, mailed Nov. 10, 2020, 4 pgs.

Gibson, Daryl; Office Action for U.S. Appl. No. 3,057,224, filed Oct. 1, 2019, mailed Jun. 23, 2021, 4 pgs.

Gibson, Daryl Lee; International Preliminary Report on Patentability for PCT Application No. PCT/US19/45451, filed Aug. 7, 2019, mailed Mar. 18, 2021, 8 pgs.

Gibson, Daryl Lee; International Search Report and Written Opinion for PCT Application No. PCT/US19/45451, filed Aug. 7, 2019, mailed Feb. 3, 2020, 11 pgs.

Gibson, Daryl Lee; Invitation to Pay Additional Fees for PCT/US19/45451, filed Aug. 7, 2019, mailed Oct. 10, 2019, 2 pgs.

Gibson, Daryl Lee; Office Action for Canadian patent application No. 3,057, 167, filed Aug. 7, 2019, mailed Nov. 19, 2019, 7 pgs.

Gibson, Daryl Lee; Office Action for Canadian patent application No. 3,057, 167, filed Aug. 7, 2019, mailed May 25, 2020, 3 pgs.

(56) References Cited

OTHER PUBLICATIONS

Gibson, Daryl Lee; Office Action for Canadian patent application No. 3,105,683, filed Aug. 7, 2019, mailed Dec. 1, 2022, 3 pgs.

Gibson, Daryl Lee; Office Action for Canadian patent application No. 3,105,683, filed Aug. 7, 2019, mailed Mar. 8, 2022, 4 pgs.

Gibson, Daryl Lee; Extended European Search Report for application No. 19857477.4, filed Aug. 7, 2019, mailed Apr. 5, 2022, 7 pgs.

Gibson, Daryl Lee; Supplementary Examination Written Opinion for Singapore patent application No. 11202101803V, filed Jul. 8, 2019, mailed Nov. 2, 2022, 4 pgs.

Gibson, Daryl Lee; Extended European Search Report for application No. 21180958.7, filed Aug. 7, 2019, mailed Oct. 5, 2021, 8 pgs.

Gibson, Daryl Lee; Office Action for Canadian application No. 3,057,202, filed Oct. 1, 2019, mailed Dec. 19, 2019, 3 pgs.

Gibson, Daryl Lee; Office Action for Canadian application No. 3,057,202, filed Oct. 1, 2019, mailed Apr. 2, 2020, 4 pgs.

Gibson, Daryl Lee; Office Action for Canadian application No. 3,057,202, filed Oct. 1, 2019, mailed Aug. 31, 2020, 4 pgs.

Gibson, Daryl Lee; Office Action for Canadian patent application No. 3,113,517, filed Oct. 1, 2019, mailed Jul. 8, 2022, 5 pgs.

Ortiz, Jorge Isaac; Notice of Allowance for U.S. Appl. No. 16/354,939, filed Mar. 15, 2019, mailed Sep. 2, 2022, 9 pgs.

Gibson, Daryl Lee; Non-Final Office Action for U.S. Appl. No. 16/874,340, filed May 14, 2020, mailed May 27, 2022, 126 pgs.

Gibson, Daryl Lee; Notice of Allowance for U.S. Appl. No. 16/874,340, filed May 14, 2020, mailed Sep. 12, 2022, 16 pgs.

Gibson, Daryl Lee; International Search Report and Written Opinion for PCT Application No. PCT/US21/31033, filed May 6, 2021, mailed Sep. 24, 2021, 12 pgs.

Gibson, Daryl Lee; Invitation to Pay Additional Fees for PCT/US21/31033, filed May 6, 2021, mailed Jul. 15, 2021, 2 pgs.

Antenna. Merriam-Webster Dictionary, 2014 [retrieved on Jun. 1, 2014]. Retrieved from the Internet: < URL: www.merriam-webster.com/dictionary/antenna>, 1 pg.

Fleury, et al.; Supplemental European Search Report for application No. 12823594.2, filed Aug. 20, 2012, mailed Feb. 18, 2015, 6 pgs.

J.A. Gallego-Juarez, G. Rodriguez-Corral and L. Gaete-Garreton, An ultrasonic transducer for high power applications in gases, Nov. 1978, Ultrasonics, published by IPC Business Press, p. 267-271, 5 pgs.

Non-Patent Literature Bimorph (entitled "Bimoprh actuators"), accessed at http:/web.archive.org/web/20080122050424/http://www.elpapiezo.ru/eng/curve_e.shtml, archived on Jan. 22, 2008, 3 pgs.

Non-Patent Literature Murata (entitled "Piezoelectric Sounds Components"), accessed at http://web.archive.org/web/20030806141815/http://www.murata.com/catalog/p37e17.pdf, archived on Aug. 6, 2003, 39 pgs.

Non-Patent Literature NerdKits, accessed at http://web.archive.org/web/20090510051850/http://www.nerdkits.com/videos/sound_meter/, archived on May 10, 2009, 6 pgs.

Gibson, Daryl Lee; International Preliminary Report on Patentability for PCT Application No. PCT/US21/31033, filed May 6, 2021, mailed Nov. 24, 2022, 9 pgs.

Ortiz, Jorge Isaac; Non-Final Office Action for U.S. Appl. No. 16/354,939, filed Mar. 15, 2019, mailed Aug. 10, 2021, 126 pgs.

Zusman, George, V.; Applicant Initiated Interview Summary for U.S. Appl. No. 14/503,951, filed Oct. 1, 2014, mailed Jul. 12, 2016, 3 pgs.

Peter, Russo Anthony; European Search Report for Patent Application No. EP95307807, filed Nov. 1, 1995, mailed Jul. 22, 1998, 5 pgs.

Hunaidi, Osama; Notice of Allowance for U.S. Appl. No. 09/482,317, filed Jan. 14, 2000, mailed May 13, 2002, 4 pgs.

Non-Patent Literature "Radiodetection Water Leak Detection Products", 2008, Radiodetection Ltd.—SPX Corporation, 12 pgs.

Zusman, George, V.; Non-Final Office Action for U.S. Appl. No. 14/503,951, filed Oct. 1, 2014, mailed Jun. 13, 2016, 77 pgs.

Ortiz, Jorge Isaac; Final Office Action for U.S. Appl. No. 15/043,057, filed Feb. 12, 2016, mailed Dec. 12, 2018, 25 pgs.

Ortiz, Jorge Isaac; Issue Notification for U.S. Appl. No. 15/043,057, filed Feb. 12, 2016, mailed Apr. 17, 2019, 1 pg.

Ortiz, Jorge Isaac; Non-Final Office Action for U.S. Appl. No. 15/043,057, filed Feb. 12, 2016, mailed Jun. 4, 2018, 94 pgs.

Ortiz, Jorge Isaac; Notice of Allowance for U.S. Appl. No. 15/043,057, filed Feb. 12, 2016, mailed Feb. 19, 2019, 8 pgs.

Ortiz, Jorge Isaac; Supplemental Notice of Allowance for U.S. Appl. No. 15/043,057, filed Feb. 12, 2016, mailed Mar. 13, 2019, 6 pgs.

Ortiz, Jorge Isaac, Notice of Allowance for U.S. Appl. No. 16/354,939, filed Mar. 15, 2019, mailed Jun. 9, 2022, 10 pgs.

Ortiz, Jorge Isaac, Final Office Action for U.S. Appl. No. 16/354,939, filed Mar. 15, 2019, mailed Mar. 17, 2022, 40 pgs.

Fleury, Jr., Leo W.; Office Action for Canadian Patent Application No. 3,161,913, filed Aug. 10, 2012, mailed Mar. 12, 2025, 3 pgs.

Ortiz, Jorge Isaac; Non-Final Office Action for U.S. Appl. No. 18/219,826, filed Jul. 10, 2023, mailed Mar. 14, 2025, 125 pgs.

Gibson, Daryl Lee; Final Office Action for U.S. Appl. No. 17/683,127, filed Feb. 28, 2022, mailed Apr. 18, 2025, 23 pgs.

Gibson, Daryl Lee; Official Action for European Patent Application No. 23154819.9, filed Dec. 20, 2016, mailed Apr. 25, 2025, 7 pgs.

Gibson, D.; Notice of Allowance for Canadian Patent Application No. 3,207,167 filed Aug. 7, 2019, mailed Feb. 6, 2025, 1 pg.

Hyland, Gregory E.; Final Office Action for U.S. Appl. No. 18/070,154, filed Nov. 28, 2022, mailed Aug. 13, 2025, 10 pgs.

Ortiz, Jorge Isaac; Final Office Action for U.S. Appl. No. 18/219,826, filed Jul. 10, 2023, mailed Aug. 26, 2025, 16 pgs.

Gibson, Daryl Lee; Notice of Allowance for U.S. Appl. No. 17/683,127, filed Feb. 28, 2022, mailed Aug. 13, 2025, 75 pgs.

Gibson, Daryl Lee; Notice of Allowance for Canadian Patent Application No. 3,177,216, filed Dec. 20, 2016, mailed Sep. 5, 2025, 1 pg.

Hyland, Gregory E.; Notice of Allowance for U.S. Appl. No. 18/070,154, filed Nov. 28, 2022, mailed Oct. 15, 2025, 7 pgs.

Leury, Jr., Leo W.; Notice of Allowance for Canadian Patent Application No. 3,161,913, filed Aug. 10, 2012, mailed Oct. 31, 2025, 1 page.

Ortiz, Jorge Isaac; Non-Final Office Action for U.S. Appl. No. 18/219,826, filed Jul. 10, 2023, mailed Nov. 18, 2025, 15 pgs.

Gibson, Daryl Lee; Office Action for Canadian Application No. 3202215, filed Jun. 6, 2023, mailed Aug. 28, 2025, 3 pgs.

Gibson, Daryl Lee; Final Office Action for U.S. Appl. No. 18/790,252, filed Jul. 31, 2024, mailed Dec. 18, 2025, 26 pgs.

Gibson, Daryl Lee; Conditional Notice of Allowance for Canadian Application No. 3,178,637, filed Nov. 11, 2022, mailed Sep. 3, 2025, 3 pgs.

* cited by examiner

SELF-LEVELING SENSOR ASSEMBLY

TECHNICAL FIELD

This disclosure relates to pipeline systems. More specifically, this disclosure relates to a self-leveling sensor for detecting leaks in a pipeline system.

BACKGROUND

Fire hydrants are commonly connected to fluid systems, such as municipal water infrastructure systems and water mains, through standpipes. Leaks within the fluid systems can send vibrations through the fluid system and up standpipes to the fire hydrants. These vibrations propagating through the standpipes and fire hydrants can be monitored by a vibration sensor to detect leaks within the connected fluid system. The vibration sensor is often housed within a nozzle cap mounted to a nozzle of the fire hydrant and typically defines an annular shape with an axis therethrough. Vertically aligning axis of the vibration sensor, thereby orienting the axis of the vibration sensor parallel to an axis extending vertically through the standpipe and fire hydrant, can provide an optimal signal-to-noise ratio. However, it is difficult to ensure a vertical orientation of the vibration sensor when threading the nozzle cap to the nozzle.

SUMMARY

It is to be understood that this summary is not an extensive overview of the disclosure. This summary is exemplary and not restrictive and is intended to neither identify key or critical elements of the disclosure nor delineate the scope thereof. The sole purpose of this summary is to explain and exemplify certain concepts of the disclosure as an introduction to the following complete and extensive detailed description.

Disclosed is a self-leveling sensor assembly comprising an outer bushing defining a bushing passage, a bushing axis extending centrally through the bushing passage; an inner housing received in the bushing passage and rotatable about the bushing axis, the inner housing comprising a housing weight disposed at a first housing side of the inner housing; and a vibration sensor mounted to the inner housing and defining a sensor axis; wherein the housing weight is configured to pull the first housing side of the inner housing downward to rotate the inner housing and the vibration sensor about the bushing axis and to align the sensor axis in a desired orientation.

Also disclosed is a leak detection assembly comprising a housing defining a cavity; and a self-leveling sensor assembly disposed within the cavity, the self-leveling sensor assembly comprising: an outer bushing defining a bushing passage; an inner housing received within the bushing passage; and a vibration sensor mounted to the inner housing and defining a sensor axis, wherein the inner housing is configured to rotate within the bushing passage to automatically align the sensor axis in a desired orientation Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, and features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
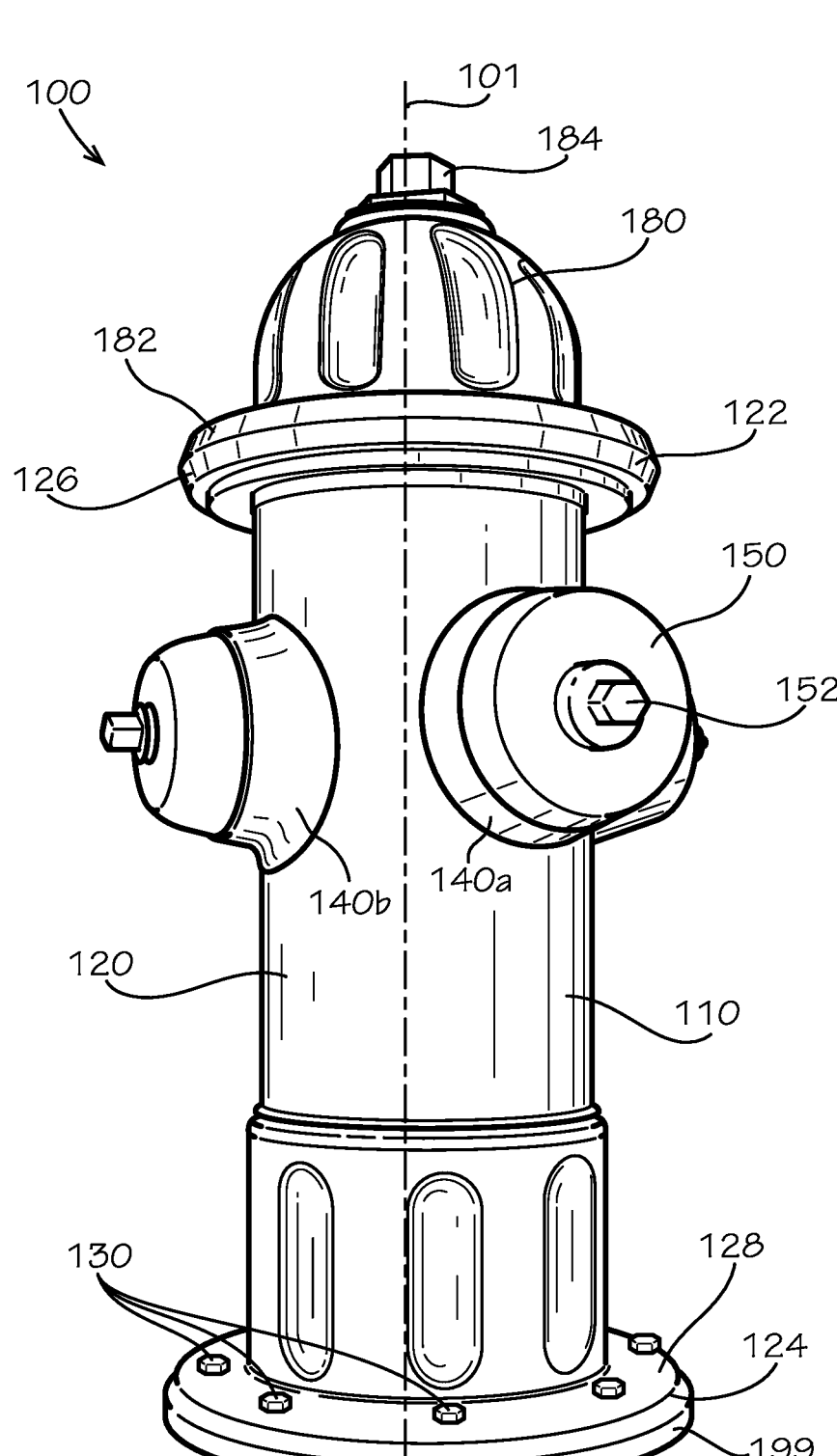
FIG. 1 is a perspective view of a hydrant assembly in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance can or cannot occur and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements, and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application, including, but not limited to, steps in disclosed methods. Thus, if there are a variety of additional steps that can be performed, it is understood that each of these additional steps can be performed with any specific aspect or combination of aspects of the disclosed methods.

Disclosed is a sensor assembly and associated methods, systems, devices, and various apparatus. The sensor assembly can be self-leveling. It would be understood by one of skill in the art that the disclosed self-leveling sensor assembly are described in but a few exemplary aspects among many. No particular terminology or description should be considered limiting on the disclosure or the scope of any claims issuing therefrom.

FIG. 1 is a perspective view of a hydrant assembly 100 comprising a fire hydrant 110 and a vibration sensor 380 (shown in FIG. 3) in accordance with one aspect of the present disclosure. The fire hydrant 110 can comprise a barrel 120, a nozzle cap 150, and a bonnet 180. The barrel 120 can define a top barrel end 122 and a bottom barrel end 124 disposed opposite from the top barrel end 122. The barrel 120 can be substantially tubular, and the barrel 120 can define a barrel axis 101 extending from the top barrel end 122 to the bottom barrel end 124. In the present aspect, the barrel axis 101 can be substantially vertically aligned, wherein the barrel axis 101 is substantially aligned with the force of gravity.

The barrel 120 can comprise a top flange 126 disposed at the top barrel end 122 and a base flange 128 disposed at the bottom barrel end 124. The base flange 128 can be fastened to a standpipe flange 199 of a standpipe 198 of a fluid system (not shown), such as a water main, for example and without limitation. In example aspects, the standpipe 198 can define a standpipe axis 197 that can be substantially aligned with the barrel axis 101. The base flange 128 can be fastened to the standpipe flange 199 by a plurality of flange fasteners 130. A bonnet flange 182 of the bonnet 180 can be attached to the top flange 126 of the barrel 120, such as with a plurality of fasteners (not shown) similar to the flange fasteners 130. The bonnet 180 can comprise an operation nut 184, or "op nut," which can be rotated to open and close a main valve (not shown) positioned at the bottom barrel end 124 or below in the standpipe 198 in order to respectively supply or cut off pressurized water flow to the fire hydrant 110.

The barrel 120 can define one or more nozzles 140a,b. The nozzle cap 150 can be screwed onto the nozzle 140a to seal the nozzle 140a. In some aspects, the nozzle cap 150 can be threaded directly onto the nozzle 140a. In other aspects, the hydrant assembly 100 can comprise a nozzle adapter for coupling the nozzle cap 150 to the nozzle 140a. For example, the nozzle adapter can be attached to the nozzle 140a, and then the nozzle cap 150 can be threaded onto the nozzle adapter to mount the nozzle cap 150 on the nozzle 140a. Conversely, in some aspects, the nozzle cap 150 can first be threaded onto the nozzle adapter, and then the nozzle adapter can be coupled to the nozzle 140a. With the nozzle cap 150 sealing the nozzle 140a, pressurized water cannot escape through the nozzle 140a when the main valve (not shown) is in an open position. The nozzle cap 150 can define a cap nut 152, which can be turned, such as with a wrench or other tool, to tighten or loosen the nozzle cap 150 on the nozzle 140a.

Figure 2:
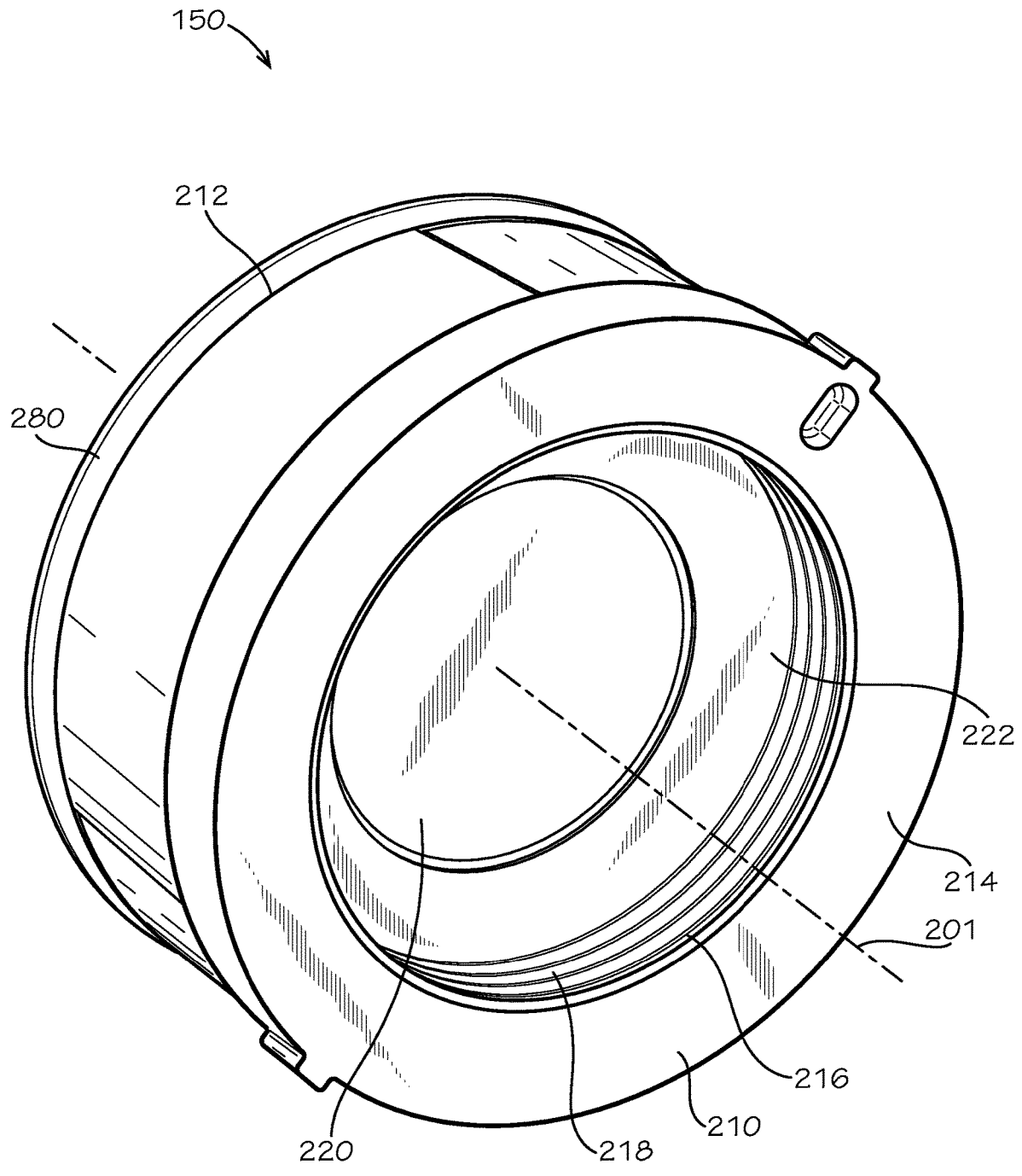
FIG. 2 is a rear perspective view of a nozzle cap of the hydrant assembly of FIG. 1.

FIG. 2 is a rear perspective view of the nozzle cap 150 of the fire hydrant 110 of FIG. 1. The nozzle cap 150 can comprise a cap body 210 and a cap cover 280. The cap body 210 can define a first body end 212 and a second body end 214 disposed opposite from the first body end 212. The cap cover 280 can be attached to the first body end 212 of the cap body 210. The cap body 210 can define a cap fastener for coupling the nozzle cap 150 to the nozzle 140a (shown in FIG. 1). The cap fastener can be, for example, a threaded bore 216 extending into the cap body 210 from the second body end 214 to an inner wall 220 of the cap body 210. The threaded bore 216 can define a cap axis 201 of the cap body 210, and the cap axis 201 can extend from the first body end 212 to the second body end 214.

The threaded bore 216 can define internal threading 218, and the threaded bore 216 can be screwed onto the nozzle 140a (shown in FIG. 1) or the nozzle adapter to mount the nozzle cap 150 on the nozzle 140a by rotating the nozzle cap 150 about the cap axis 201. In the present aspect, the internal threading 218 can be straight threading that does not taper from the second body end 214 towards the inner wall 220. In other aspects, the internal threading 218 can be tapered threading that tapers from the second body end 214 towards the inner wall 220. In some aspects, a gasket 222 can be positioned adjacent to the inner wall 220, and the gasket 222 can be configured to form a seal with the nozzle 140a when the nozzle cap 150 is screwed onto the nozzle 140a in a sealed position.

Figure 3:
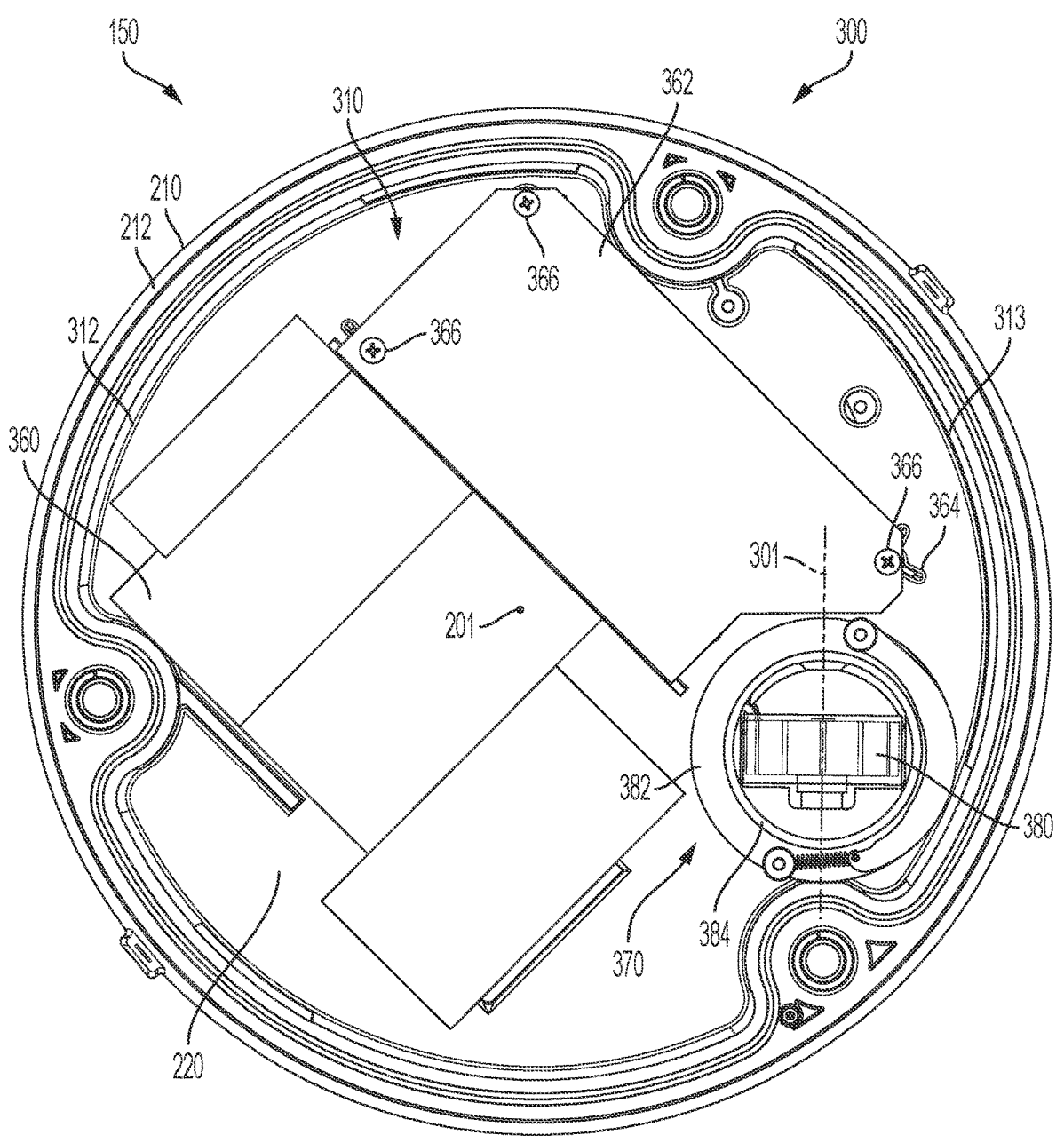
FIG. 3 is a front view of the nozzle cap of FIG. 2, shown with a cap cover of the nozzle cap removed, wherein the nozzle cap is in a first orientation.

FIG. 3 is a front view of the nozzle cap 150 of FIG. 1 with the cap cover 280 (shown in FIG. 2) removed from the cap body 210. Such nozzle caps 150 are described in U.S. Pat. No. 10,859,462, issued Dec. 8, 2020, and U.S. application Ser. No. 16/428,744, filed May 31, 2019, each of which is hereby specifically incorporated by reference herein in its entirety. The cap body 210 can define a cavity 310 extending inwards into the cap body 210 from the first body end 212 to the inner wall 220. In the present aspect, the cavity 310 can extend axially inward relative to the cap axis 201, shown extending out of the page. The inner wall 220 can separate the cavity 310 from the threaded bore 216 (shown in FIG. 2). The cap body 210 can define a circumferential wall 312, which can partially enclose the cavity 310 and can extend circumferentially around the cavity 310 relative to the cap axis 201. The circumferential wall 312 can comprise a non-ferrous material to allow signals from an antenna (described in further detail below) to pass through the circumferential wall 312. For example, the circumferential wall 312 can comprise a plastic material in example aspects; however, in other aspects, the circumferential wall 312 can comprise any other suitable non-ferrous material having a sufficient rigidity for protecting the interior components of the nozzle cap 150. A cavity opening 313 to the cavity 310 can be defined at the first body end 212. The nozzle cap 150 can further comprise a battery pack 360 and a printed circuit board ("PCB") 362, each disposed within the cavity 310. The PCB 362 can be attached to a mounting bracket 364, which can be secured within the cavity 310 by one or more bracket fasteners 366.

As shown, a leak detection assembly 300 can comprise the nozzle cap 150 of the fire hydrant 110 (shown in FIG. 1) and a self-leveling sensor assembly 370 disposed within the cavity 310 of the nozzle cap 150. The self-leveling sensor assembly 370 can automatically and by its own nature align itself in a desired orientation. The desired orientation can be any suitable orientation, including a vertical orientation, a horizontal orientation, and any orientation therebetween. The self-leveling sensor assembly 370 can comprise the vibration sensor 380. The vibration sensor 380 can define a sensor axis 301, which can be substantially perpendicular to the cap axis 201. The self-leveling sensor assembly 370 can further comprise an outer bushing 382 and an inner housing 384. The inner housing 384 can be disposed within the outer bushing 382, and vibration sensor 380 can be disposed within the inner housing 384. The inner housing 384 can be configured to rotate relative to the outer bushing 382, as described in further detail below. The outer bushing 382 can be attached to the circumferential wall 312, and the self-leveling sensor assembly 370 can extend generally radially inward from the circumferential wall 312 and into the cavity 310 with respect to the cap axis 201. According to example aspects, the outer bushing 382 can comprise a metal material, such as brass for example and without limitation. In example aspects, the inner housing 384 can also comprise a metal material, such as aluminum for example and without limitation. In other aspects, either or both of the outer bushing 382 and the inner housing 384 can comprise any other suitable metal or non-metal material.

The signal-to-noise ratio detected by the vibration sensor 380 can decrease as the sensor axis 301 moves from a perpendicular orientation relative to the barrel axis 101 (shown in FIG. 1) of the barrel 120 (shown in FIG. 1) to parallel orientation relative to the barrel axis 101. Thus, the signal-to noise ratio can improves as the sensor axis 301 moves closer to a parallel alignment with the barrel axis 101, and the signal-to-noise ratio can generally be optimized when the sensor axis 301 is in parallel alignment with the barrel axis 101, such as when vertically aligned relative to the direction of gravity. As described in further detail below, the vibration sensor 380 of the present aspect can be self-leveling, such that the sensor axis 301 can be configured to automatically align in a desired orientation, such as a substantially vertical orientation in the current aspect, regardless of the orientation of the nozzle cap 150 on the fire hydrant 110. FIG. 3 illustrates the nozzle cap 150 in a first orientation, wherein the vibration sensor 380 and the sensor axis 301 are oriented in a first potential position. In this first potential position, the sensor axis 301 can be generally oriented in a four-o-clock position. As shown, in the four-o-clock position, the self-leveling sensor assembly 370 can automatically align the sensor axis 301 in the optimal vertical orientation, substantially parallel to the barrel axis 101 of the fire hydrant 110 and the direction of gravity.

In other aspects, in place of the nozzle cap 150, the leak detection assembly 300 can comprise any suitable housing that can be connected directly or indirectly to the fluid system to monitor for leaks. For example, the self-leveling sensor assembly 370 could be disposed within a housing that is incorporated in a valve, pumper cap, or any other suitable fitting or attachment of the fluid system. In aspects of the leak detection assembly 300 not mounted to the fire hydrant 110, the self-leveling sensor assembly 370 can be configured to automatically align the sensor axis 301 with the direction of gravity (or any other desired orientation).

The battery pack 360, the PCB 362, and the vibration sensor 380 can be connected together in electrical communication. The vibration sensor 380 can be configured to detect leaks within the fluid system (not shown) by monitoring vibrations traveling up the standpipe 198 (shown in FIG. 1) and through the fire hydrant 110 when the nozzle cap 150 is mounted on the nozzle 140a (shown in FIG. 1). Vibration patterns within the fluid system can indicate the presence of leaks within the fluid system. With the vibration sensor 380 attached to the cap body 210 and the nozzle cap 150 attached to the nozzle 140a (shown in FIG. 1), the vibration sensor 380 can detect vibrations from the fluid system and convert the vibrations to a voltage signal, which can then be interpreted by the PCB 362 to determine if leaks are present within the fluid system. A signal can then be transmitted outwards from the nozzle cap 150 by the antenna to convey to a third party whether leaks have been identified within the fluid system. In some aspects, the antenna can disposed on a printed circuit board (a "PCB") attached to the circumferential wall 312 of the nozzle cap 150.

Figure 4:
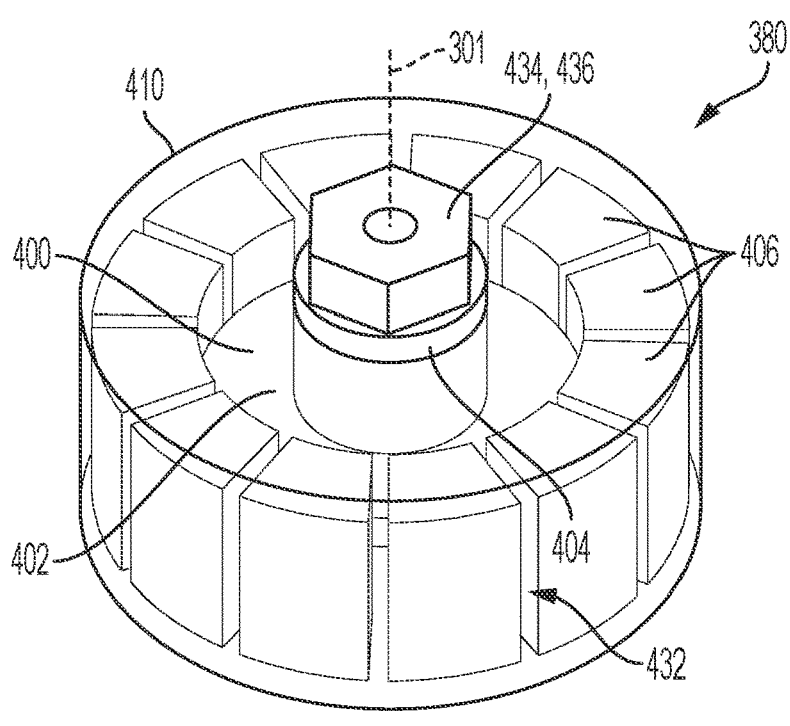
FIG. 4 is a perspective view of one example aspect of a vibration sensor in accordance with an aspect of the present disclosure.

FIG. 4 is a perspective view of one example aspect of the vibration sensor 380 of FIG. 3, wherein the vibration sensor 380 can be a piezoelectric vibration sensor 380. Exemplary piezoelectric vibration sensors 380 are described in greater detail in U.S. Pat. No. 9,528,903, issued Dec. 27, 2016, which is hereby incorporated by reference in its entirety. In example aspects, the piezoelectric vibration sensor 380 can comprise a base 400 and a plurality of calibration masses 406. The base 400 can comprise at least one piezoelectric crystal 402 coupled to an internal core 708 (shown in FIG. 7) at a first side thereof. In the present aspect, the base 400 can further comprise a second piezoelectric crystal 703 (shown in FIG. 7) coupled to the internal core 708 at an opposite second side thereof. When the vibration sensor 380 is exposed to vibrations, the calibration masses 406 can oscillate axially relative to the base 400, which can produce internal stresses within the piezoelectric crystal 402. Stresses within the piezoelectric crystals 402,703 can produce a voltage signal, which can be processed by the PCB 362 (shown in FIG. 3), as described above.

The base 400 and the calibrations masses 406 can be housed within a sensor housing 410. The calibration masses 406 can be distributed circumferentially around the base 400. In the present aspect, the calibration masses 406 can be integrally formed with the internal core 708; however, in other aspects, the calibration masses 406 can be separate components that can be attached to the internal core 708, such as with glue, adhesive, mastic, epoxy, or another method such as welding, brazing, soldering, or any other attachment method for example and without limitation. In the present aspect, the calibration masses 406 can extend axially outward, with respect to the sensor axis 301, from each of the piezoelectric crystals 402,703. A notch 432 can be defined between each pair of adjacent calibration masses 406, and the calibration masses 406 can vibrate independently from one another.

Each of the piezoelectric crystals 402,703 can be attached to the internal core 708 and can be disposed radially inward from the calibration masses 406 with respect to the sensor axis 301. In some aspects, the piezoelectric crystals 402,703 can be bonded to the internal core 708 with a conductive adhesive. In other aspects, the piezoelectric crystals 402,703 can be attached to the internal core 708 through other suitable means such as double-sided tape, various glues, various coatings including elastomeric and silicon coatings among others, pure adhesives, or by one or more fasteners and/or washers.

In the present aspect, a first sensor fastener 702 (shown in FIG. 7) can be provided to attach the vibration sensor 380 to the inner housing 384. As shown, the vibration sensor 380 can further comprise a spacer 404 coupled to the sensor housing 410 and/or the piezoelectric crystal 402. The spacer 404 can be configured to fit over the first sensor fastener 702 between the piezoelectric crystal 402 and an outer distal end 704 (shown in FIG. 7) of the first sensor fastener 702 to couple the first sensor fastener 702 to the vibration sensor 380. In example aspects, the spacer 404 can comprise a nut portion 434 in the form of a hex nut 436, as shown.

Figure 5:
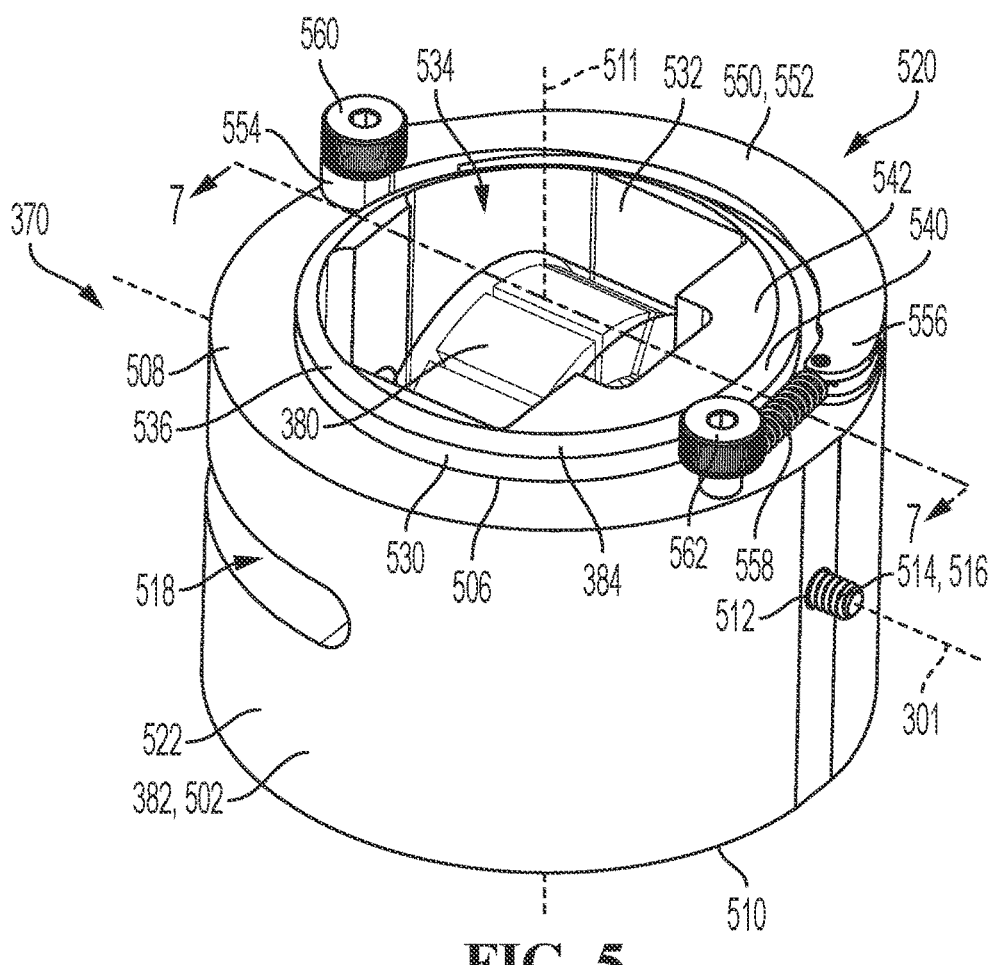
FIG. 5 is a perspective view of a self-leveling sensor assembly comprising the vibration sensor of FIG. 4, in accordance with an aspect of the present disclosure.

FIG. 5 illustrates an example aspect of the self-leveling sensor assembly 370. The self-leveling sensor assembly 370 can comprise the brass outer bushing 382, the aluminum inner housing 384 rotatably received within the brass outer bushing 382, and the vibration sensor 380 coupled to and received within the aluminum inner housing 384. According to example aspects, the outer bushing 382 can be substantially cylindrical in shape. The outer bushing 382 can define a bushing outer surface 502 and a bushing inner surface 604 (shown in FIG. 6). The bushing inner surface 604 defines a substantially cylindrical bushing passage 506 formed therethrough, within which the inner housing 384 can be rotatably received. The bushing passage 506 can extend from a first bushing end 508 of the outer bushing 382 to a second bushing end 510 of the outer bushing 382 opposite the first bushing end 508, and a bushing axis 511 can extend centrally through the bushing passage 506.

A bushing fastener opening 512 can extend through the outer bushing 382 from the bushing inner surface 604 to the bushing outer surface 502. A bushing fastener 514, such as a bolt or screw, for example and without limitation, can extend through the bushing fastener opening 512 and can couple the self-leveling sensor assembly 370 to the circumferential wall 312 (shown in FIG. 3) of the nozzle cap 150 (shown in FIG. 1). For example, the bushing fastener 514 can define a threaded shaft 516 configured to engage a threaded opening (not shown) formed in the circumferential wall 312. Substantially opposite the bushing fastener opening 512, a guide slot 518 can be formed through the outer bushing 382 from the bushing inner surface 604 to the bushing outer surface 502. The guide slot 518 can extend partially about the circumference of the outer bushing 382. For example, in some aspects, the guide slot 518 can extend about 180° around the circumference of the outer bushing 382. In other aspects, the guide slot 518 can extend more or less than 180° about the circumference of the outer bushing 382 as desired. In other aspects, the outer bushing 382 may not comprise the guide slot 518.

The inner housing 384 can be substantially cylindrical in shape. The inner housing 384 can define a housing outer surface 530 and a housing inner surface 532. The housing inner surface 532 can define a housing passage 534 formed therethrough, within which the vibration sensor 380 can be received. The housing passage 534 can extend from a first housing end 536 of the inner housing 384 to a second housing end 638 (shown in FIG. 6) of the inner housing 384. In example aspects, the inner housing 384 can be weighted at a first housing side 540 thereof. For example, a housing weight 542 can be disposed within the housing passage 534, such that the housing passage 534 can be truncated by the weight, as shown. In the present aspect, the housing weight 542 can be formed monolithically with (i.e., formed as a singular component that constitutes a single material without joints or seams) the inner housing 384 at the first housing side 540, such that the housing inner surface 532 can partially define the housing weight 542. In other aspects, the housing weight 542 can be formed separately from and affixed to the housing inner surface 532. The sensor axis 301 of the vibration sensor 380 can extend through the housing weight 542, and the mass of the housing weight 542 can be evenly distributed on either side of the sensor axis 301. In operation, the force of gravity can pull the housing weight 542 downward, and thus, the housing weight 542 can pull the weighted first housing side 540 of the inner housing 384 downward, rotating the inner housing 384 and the vibration sensor 380 within the outer bushing 382 and vertically aligning the sensor axis 301 with the barrel axis 101 (shown in FIG. 1) and the direction of gravity.

According to example aspects, the self-leveling sensor assembly 370 can further comprise a locking feature 550. The locking feature 550 can be configurable in an unlocked configuration, wherein the inner housing 384 and the vibration sensor 380 attached thereto can be free to rotate within the outer bushing 382 about the bushing axis 511, and a locked configuration, wherein the inner housing 384 and the vibration sensor 380 can be locked in place relative to the outer bushing 382. Example aspects of the locking feature 550 can comprise a locking wedge 552 and a locking spring 558 biasing the locking wedge 552 to the locked configuration. The locking wedge 552 can be substantially arcuate in the present aspect and can be disposed generally at the first bushing end 508 and a first bushing side 520 of the outer bushing 382. The first bushing side 520 can be disposed substantially opposite a second bushing side 522 of the outer bushing 382. The locking wedge 552 can define a first wedge end 554 and a second wedge end 556 opposite the first wedge end 554. The first wedge end 554 of the locking wedge 552 can be affixed to the outer bushing 382 by a first locking fastener 560. The second wedge end 556 of the locking wedge 552 can be affixed to the locking spring 558, and the locking spring 558 can extend between the second wedge end 556 and a second locking fastener 562. The second locking fastener 562 can affix the locking spring 558 to the outer bushing 382, as shown. The unlocked and locked configurations of the locking feature 550 are described in further detail below with respect to FIGS. 8-11.

Figure 6:
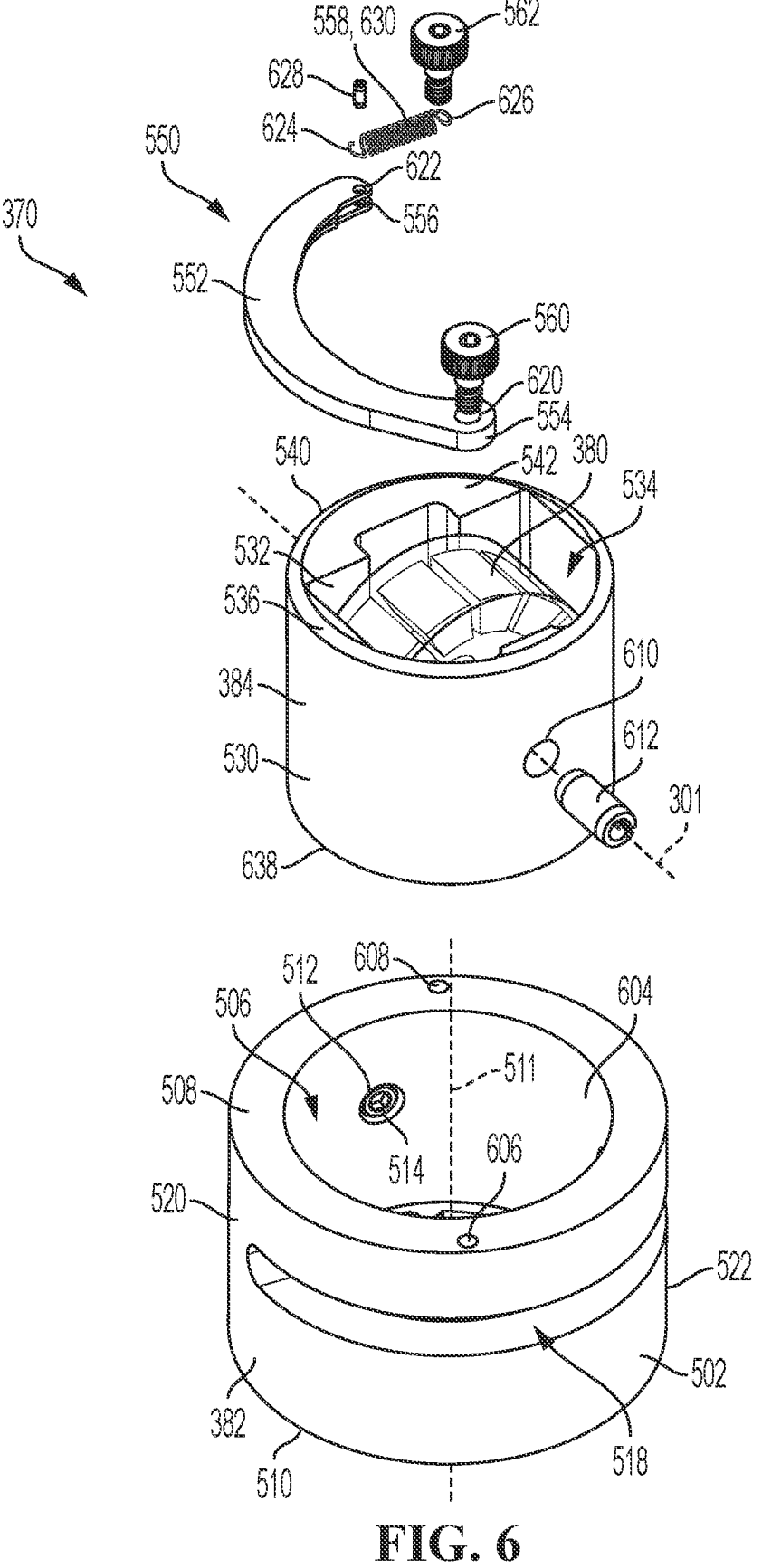
FIG. 6 is an exploded view of the self-leveling sensor assembly of FIG. 5.

FIG. 6 illustrates an exploded view of the self-leveling sensor assembly 370. The self-leveling sensor assembly 370 can comprise the outer bushing 382, the inner housing 384, the vibration sensor 380, and the locking feature 550. The outer bushing 382 can define the bushing outer surface 502 and the bushing inner surface 604. The bushing inner surface 604 can define the bushing passage 506 extending from the first bushing end 508 to the second bushing end 510. Each of the bushing fastener opening 512 and the guide slot 518 can extend through the outer bushing 382 from the bushing inner surface 604 to the bushing outer surface 502. The bushing fastener 514 extends through the bushing fastener opening 512 to couple the self-leveling sensor assembly 370 to the circumferential wall 312 (shown in FIG. 3) of the nozzle cap 150 (shown in FIG. 1). A first bushing locking hole 606 (shown in FIG. 6) and a second bushing locking hole 608 can extend into the outer bushing 382 at the first bushing end 508, substantially perpendicular to the bushing axis 511. The first bushing locking hole 606 and the second bushing locking hole 608 can be configured to receive the first locking fastener 560 and the second locking fastener 562, respectively.

The inner housing 384 can define the housing outer surface 530 and the housing inner surface 532. The housing inner surface 532 can define the housing passage 534 therethrough. The vibration sensor 380 can be disposed within the housing passage 534 of the inner housing 384, and the vibration sensor 380 can be coupled to the inner housing 384 by the first sensor fastener 702 (shown in FIG. 7). The housing weight 542 can be disposed within the housing passage 534 and can be coupled to the housing inner surface 532 or formed monolithically with the inner housing 384 at the first housing side 540. The sensor axis 301 can extend through the housing weight 542, with the mass of the housing weight 542 evenly distributed on either side of the sensor axis 301. Example aspects of the inner housing 384 can further define a guide opening 610 extending therethrough from the housing inner surface 532 to the housing outer surface 530. The guide opening 610 can be disposed substantially opposite the housing weight 542, and in the present aspect, can be concentric with the sensor axis 301. A guide pin 612 can be received in the guide opening 610 of the inner housing 384. When assembled with the inner housing 384, the guide pin 612 can extend radially outward from the housing outer surface 530, relative to the bushing axis 511 of the outer bushing 382. The guide pin 612 can be configured to engage and slide within the guide slot 518 of the outer bushing 382 as the inner housing 384 rotates within the bushing passage 506.

The locking feature 550 can comprise the locking wedge 552, the locking spring 558, the first locking fastener 560, and the second locking fastener 562. The first locking fastener 560 can be configured to engage a first wedge locking hole 620 of the locking wedge 552 and the first bushing locking hole 606 of the outer bushing 382 to couple the first wedge end 554 of the locking wedge 552 to the outer bushing 382. The locking spring 558 can be coupled to the locking wedge 552 at the second wedge end 556 by a spring fastener 628. The spring fastener 628 can be configured to engage a first hooked end 624 of the locking spring 558 and a second wedge locking hole 622 of the locking wedge 552 to couple the locking spring 558 to the locking wedge 552. The locking spring 558 can further define a second hooked end 626 opposite the first hooked end 624. The second locking fastener 562 can be configured to engage the second hooked end 626 of the locking spring 558 and the second bushing locking hole 608 of the outer bushing 382 to couple the locking spring 558 to the outer bushing 382. According to example aspects, the locking spring 558 can be a helical extension spring 630, as shown, which can bias the locking wedge 552 to the locked configuration. In other aspects, any other suitable type of spring mechanism known in the art can be used to bias the locking wedge 552 to the locked configuration.

Figure 7:
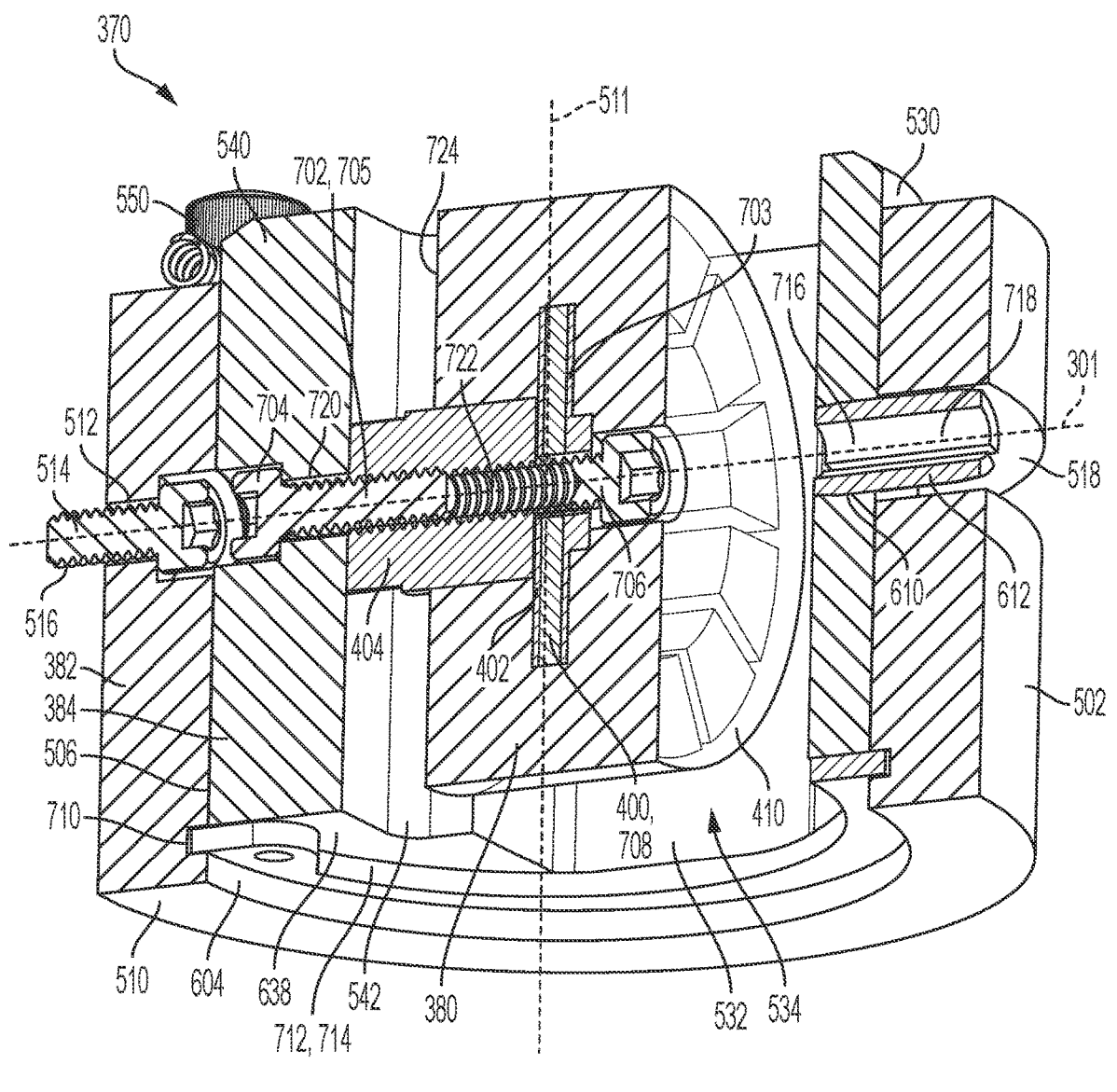
FIG. 7 is a cross-sectional view of the self-leveling sensor assembly of FIG. 5 taken along line 7-7 in FIG. 5.

FIG. 7 is a cross-sectional view of the self-leveling sensor assembly 370 taken along line 7-7 in FIG. 5. As shown, the inner housing 384 can be received in the bushing passage 506 of the outer bushing 382, and the vibration sensor 380 can be received in the housing passage 534 of the inner housing 384. The outer bushing 382 can define the bushing fastener opening 512 and the guide slot 518. The bushing fastener 514 can extend through the bushing fastener opening 512 to couple the self-leveling sensor assembly 370 to the nozzle cap 150 (shown in FIG. 1). The bushing fastener 514 can define the threaded shaft 516 extending radially outward beyond the bushing outer surface 502, relative to the bushing axis 511. In the present aspect, the bushing fastener opening 512 and the bushing fastener 514 can be substantially aligned with the sensor axis 301. However, in other aspects, the bushing fastener opening 512 and the bushing fastener 514 may not be aligned with the sensor axis 301.

As shown, example aspects of the outer bushing 382 can further comprise a circumferential groove 710, or an at least partially circumferential groove 710, formed in the bushing inner surface 604 proximate to the second bushing end 510. The self-leveling sensor assembly 370 can comprise a retaining ring 712 engaging the circumferential groove 710 and extending radially inward into the bushing passage 506 relative to the bushing axis 511. In the present aspect, the retaining ring 712 can be a split ring 714; however, in other aspects, the retaining ring 712 may not be a split ring 714. The second housing end 638 of the inner housing 384 can confront the retaining ring 712, and the retaining ring 712 can serve as a stop for the inner housing 384 to prevent the inner housing 384 from sliding axially through the bushing passage 506 past the retaining ring 712, relative to the bushing axis 511. Furthermore, in the locked configuration of the locking feature 550, the second housing end 638 of the inner housing 384 can be pressed against the retaining ring 712 to prohibit rotation of the inner housing 384, as described in further detail below.

The inner housing 384 can be rotationally disposed within the bushing passage 506 for rotation about the bushing axis 511. The housing outer surface 530 of the inner housing 384 can be configured to slide along the bushing inner surface 604 of the outer bushing 382 to allow for easy rotation of the inner housing 384 relative to outer bushing 382. In some aspects, a bearing oil can be provided between the bushing inner surface 604 of the outer bushing 382 and the housing outer surface 530 of the inner housing 384 to further facilitate the rotation of the inner housing 384 within the bushing passage 506. In some aspects, the outer bushing 382 can comprise a self-lubricating brass material. Other aspects of the self-leveling sensor assembly 370 can utilize any other lubricant or lubricating material or technique to facilitate the rotation of the inner housing 384, or the self-leveling sensor assembly 370 may not comprise such a lubricant or lubricating material or technique. As shown, the inner housing 384 can define the guide opening 610. An inner pin portion 716 of the guide pin 612 can be received within the guide opening 610, and an outer pin portion 718 of the guide pin 612 can extend radially outward from the inner housing 384, relative to the bushing axis 511, and into the guide slot 518 of the outer bushing 382. The outer pin portion 718 of the guide pin 612 can be configured to slide within the guide slot 518 as the outer bushing 382 rotates within the bushing passage 506 about the bushing axis 511. In the present aspect, the guide slot 518 can extend about 180° about the circumference of the outer bushing 382. Thus, with the outer pin portion 718 engaging the guide slot 518, the rotation of the inner housing 384 can be limited to about 180°.

The self-leveling sensor assembly 370 can further comprise the first sensor fastener 702 for coupling the vibration sensor 380 to the inner housing 384. As shown, the vibration sensor 380 can be received within the housing passage 534 of the inner housing 384. The housing weight 542 can be monolithically formed with the inner housing 384 at the first housing side 540. A housing opening 720 can extend through the housing weight 542 from the housing inner surface 532 to the housing outer surface 530. In other aspects, the housing opening 720 can be formed through the inner housing 384 at any suitable location. The first sensor fastener 702 can extend through the housing opening 720 and can engage the vibration sensor 380 to couple the vibration sensor 380 to the inner housing 384. Specifically, a threaded end 705 of the first sensor fastener 702 can extend through the housing opening 720 and the spacer 404 and can extend into a sensor opening 722 of the vibration sensor 380. The sensor opening 722 or a portion thereof can be threaded for threaded engagement with the threaded end 705 of the first sensor fastener 702. The sensor opening 722 can extend into the sensor housing 410 at a first sensor side 724 and can extend partially or fully through the sensor housing 410.

As shown, the first sensor fastener 702 can extend into sensor opening 722 at the first sensor side 724, and in some aspects, can be received at least partially through the piezoelectric crystal 402. In some aspects, the first sensor fastener 702 can further extend into the internal core 708 to couple the piezoelectric crystal 402 to the internal core 708. A second sensor fastener 706 can extend into the sensor opening 722 through the second piezoelectric crystal 703 and into the internal core 708 thereof to couple to the second piezoelectric crystal 703 the internal core 708. As shown, the sensor axis 301 can extend through the first sensor fastener 702 along its length and through the second sensor fastener 706 along its length in the present aspect.

Figure 8:
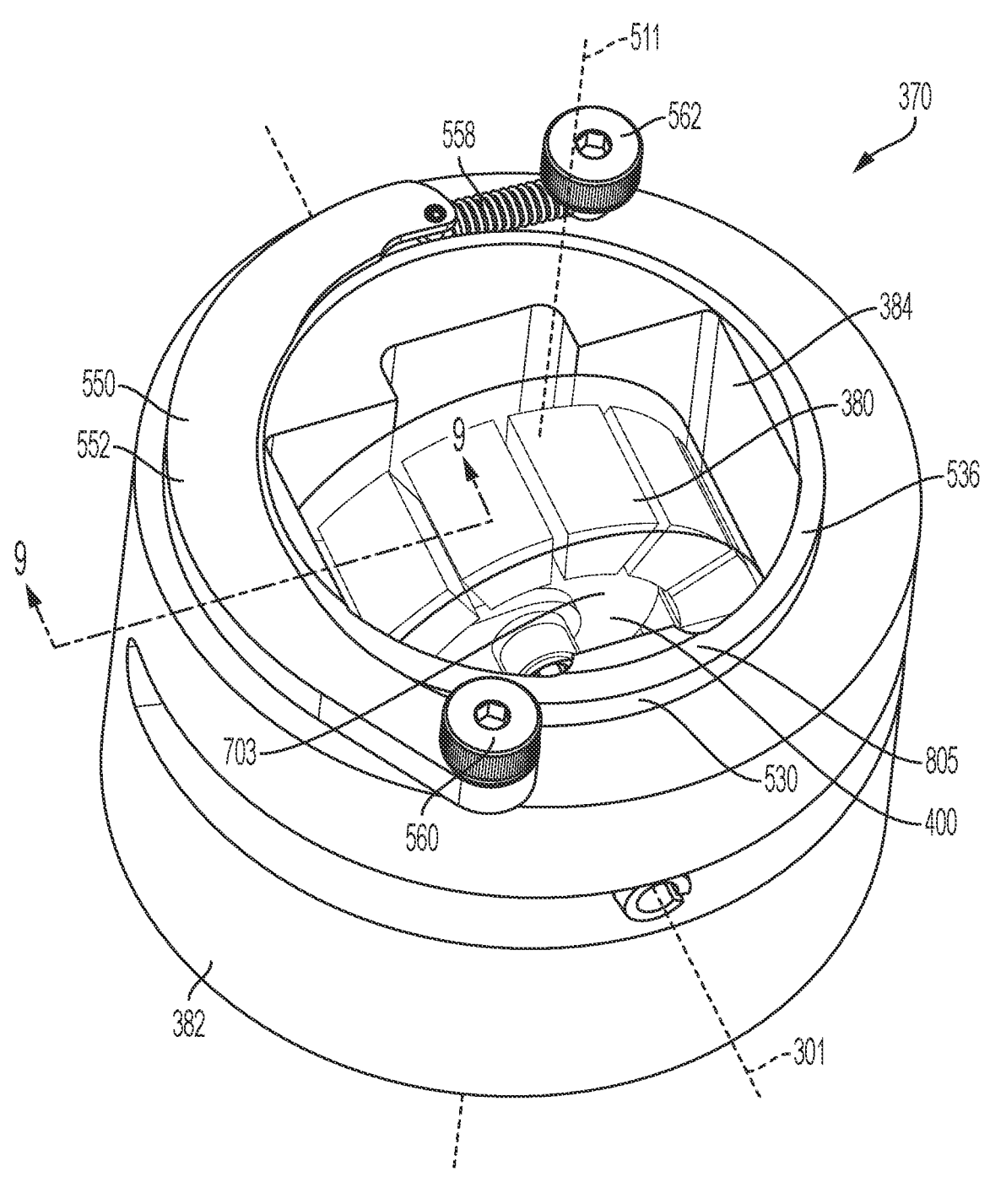
FIG. 8 is another perspective view of the self-leveling sensor assembly of FIG. 5 in a locked configuration.
Figure 9:
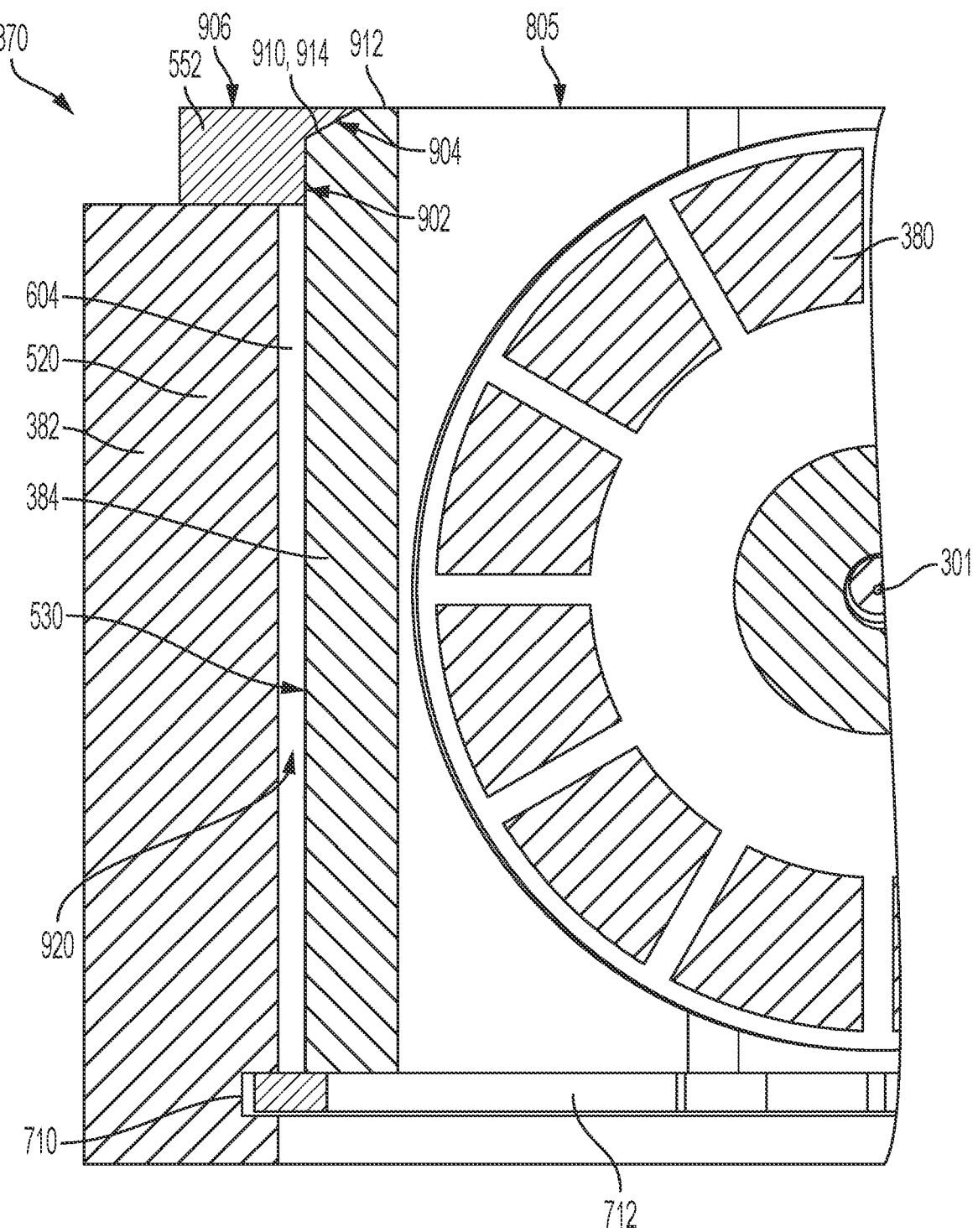
FIG. 9 is a detailed cross-sectional view of the self-leveling sensor assembly of FIG. 5 in the locked configuration, taken along line 9-9 in FIG. 8.

FIGS. 8 and 9 illustrate the self-leveling sensor assembly 370 with the locking feature 550 in the locked configuration, wherein the inner housing 384 and the attached vibration sensor 380 can be prohibited from rotating relative to the outer bushing 382. Referring to FIG. 8, the locking feature 550 can comprise the locking wedge 552 and the locking spring 558 coupled to the locking wedge 552. The locking spring 558 and the locking wedge 552 can be affixed to the outer bushing 382 by the first locking fastener 560 and the second locking fastener 562, as described above. The locking spring 558 can be configured to bias the locking feature 550 to the locked configuration. In the locked configuration, the locking spring 558 can bias the locking wedge 552 to slide radially inward relative to the bushing axis 511, and the locking wedge 552 can engage the inner housing 384 at the first housing end 536. In example aspects, the locking wedge 552 can slide over and press axially downward, relative to the bushing axis 511, against a housing top surface 805 of the inner housing 384. The locking wedge 552 can also push radially inward, relative to the bushing axis 511, against the housing top surface 805 and the housing outer surface 530 of the inner housing 384.

Referring to FIG. 9, the locking wedge 552 can define an inner wedge surface 902 oriented substantially parallel to the housing outer surface 530. The locking wedge 552 can further define an angled wedge surface 904 extending substantially inward and upward, relative to the orientation shown, from the inner wedge surface 902 to a top wedge surface 906 of the locking wedge 552. As the locking wedge 552 is biased from the unlocked configuration to the locked configuration by the locking spring 558 (shown in FIG. 5), the angled wedge surface 904 can engage a complementary angled portion 910 of the housing top surface 805 of the inner housing 384. The angled portion 910 of the housing top surface 805 can extend from the housing outer surface 530 to a leveled portion 912 of the housing top surface 805 that can be substantially perpendicular to the housing outer surface 530. In example aspects, the angled portion 910 can generally be formed as a chamfered edge 914 extending circumferentially about the inner housing 384.

As the locking wedge 552 is biased radially inward by the locking spring 558, the angled wedge surface 904 can slide along and press radially inward and downward against the angled portion 910 of the housing top surface 805. More specifically, the locking wedge 552 can push the inner housing 384 downward against the retaining ring 712 and can further push the inner housing 384 laterally against the bushing inner surface 604 at the second bushing side 522 (shown in FIG. 8) of the outer bushing 382. In some aspects, the inner wedge surface 902 can also engage the housing outer surface 530 to further bias the inner housing 384 against bushing inner surface 604 at the second bushing side 522. For illustrative purposes, an exaggerated gap 920 is shown between the inner housing 384 and the outer bushing 382 at the first bushing side 520 to demonstrate how the inner housing 384 can be biased away from the outer bushing 382 at the first bushing side 520 and towards the second bushing side 522 of the outer bushing 382; however, such a gap 920 between the inner housing 384 at the outer bushing 382 at the first bushing side 520 in the locked configuration may be miniscule.

Biasing the inner housing 384 against the retaining ring 712 and the bushing inner surface 604 can prevent the inner housing 384 from rotating relative to the outer bushing 382 in the locked configuration. It can be desirable to lock the inner housing 384 and the attached vibration sensor 380 in position relative to the outer bushing 382 to prevent rotation of the inner housing 384 during assembly and transport of the nozzle cap 150 (shown in FIG. 1) and during installation of the nozzle cap 150 with the fire hydrant 110 (shown in FIG. 1). It can further be desirable to lock the inner housing 384 and the attached vibration sensor 380 in position once the nozzle cap 150 has been installed with the fire hydrant 110 and once the self-leveling sensor assembly 370 has self-oriented the sensor axis 301 (shown extending out of the page) in the optimal vertical alignment.

Figure 10:
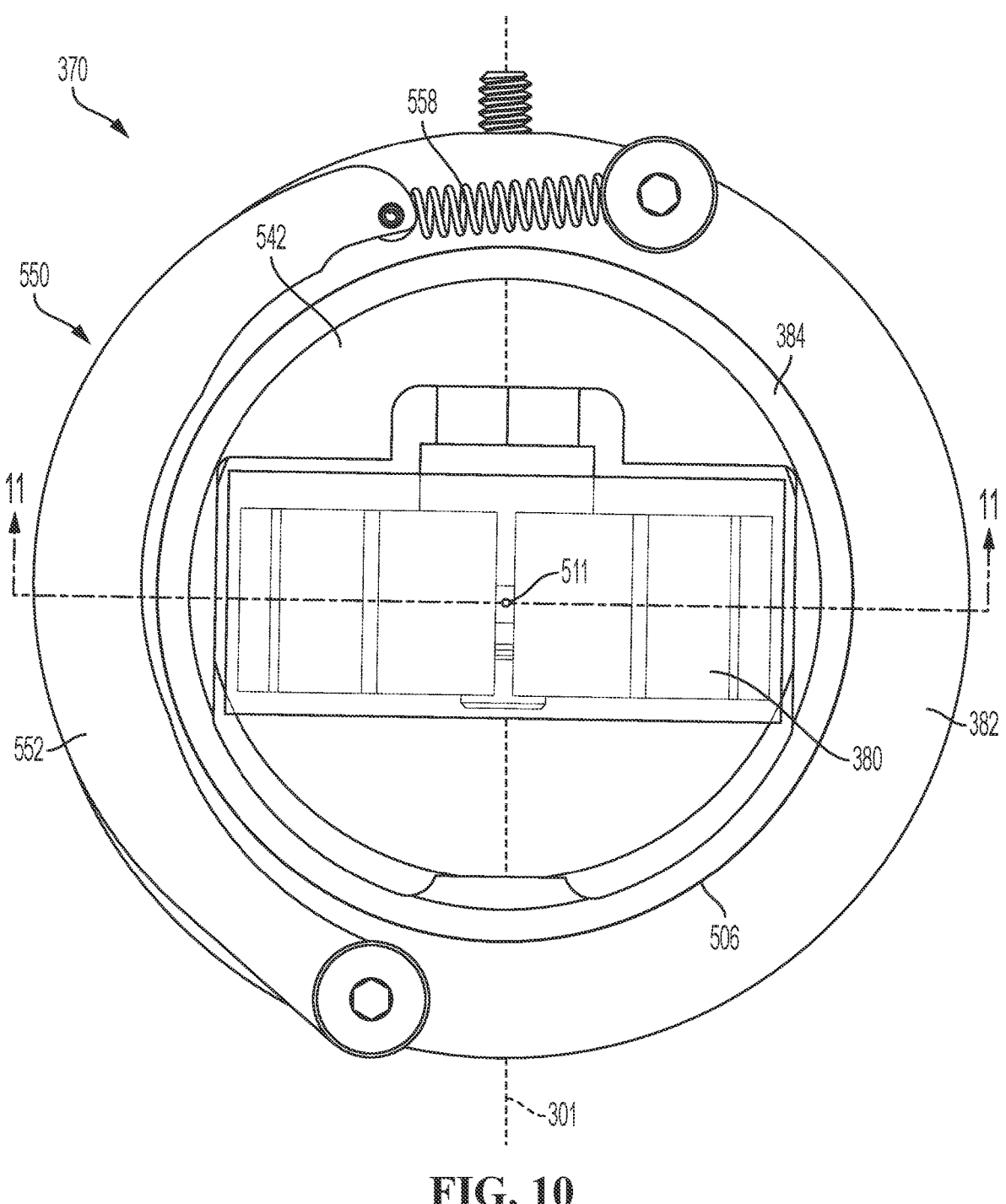
FIG. 10 is a front view of the self-leveling sensor assembly of FIG. 5 in an unlocked configuration.
Figure 11:
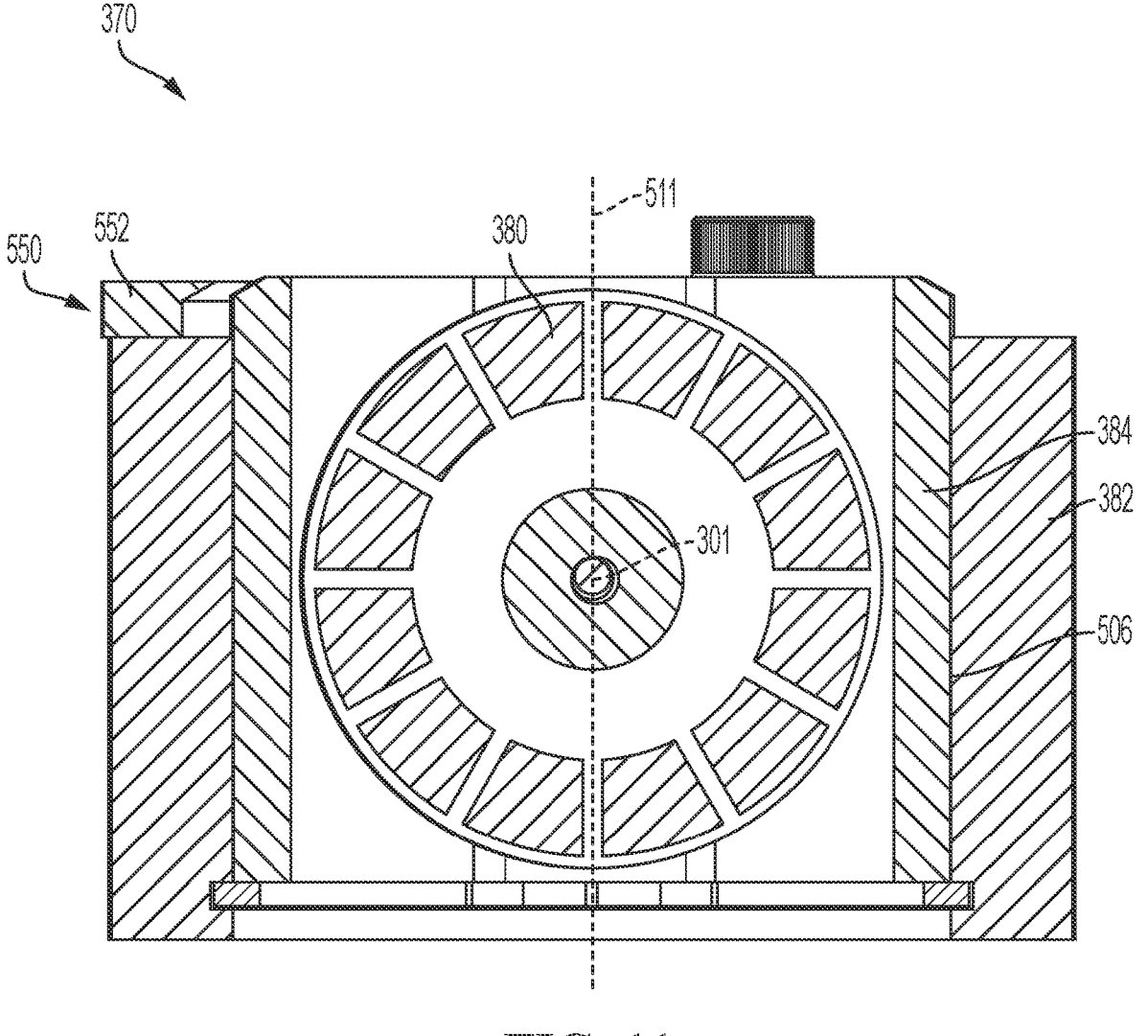
FIG. 11 is a cross-sectional view of the self-leveling sensor assembly of FIG. 5 in the unlocked configuration, taken along line 11-11 in FIG. 10.

FIGS. 10 and 11 illustrate the self-leveling sensor assembly 370 with the locking feature 550 in the unlocked configuration, wherein the inner housing 384 and the attached vibration sensor 380 can be free to rotate within the bushing passage 506 about the bushing axis 511. In the unlocked configuration, the locking wedge 552 of the locking feature 550 can be forced radially outward relative to the bushing axis 511 (coming out of the page in FIG. 10) to disengage the locking wedge 552 from the inner housing 384. Once the locking wedge 552 has been disengaged from the inner housing 384, the inner housing 384 can rotate freely within the bushing passage 506 of the outer bushing 382 to optimally align the sensor axis 301 of the vibration sensor 380 with the vertical. In some aspects, the locking wedge 552 can be drawn radially outward and away from the inner housing 384 by an external unlocking magnet 1210 (shown in FIG. 12). The external unlocking magnet 1210 can be placed in proximity to the locking feature 550, outside of the nozzle cap 150 (shown in FIG. 12), by an installer or utility worker. The locking wedge 552 can comprise a magnetic material that can be magnetically pulled towards the external unlocking magnet 1210, and the magnetic pull can be strong enough to overcome a spring force of the locking spring 558. Once the sensor axis 301 has aligned with the vertical, the external unlocking magnet 1210 can be removed from proximity to the nozzle cap 150, and the locking spring 558 can bias the locking wedge 552 back to the locked configuration. In other aspects, the locking wedge 552 can be disengaged from the inner housing 384 in the unlocked configuration by any other suitable technique.

Figure 12:
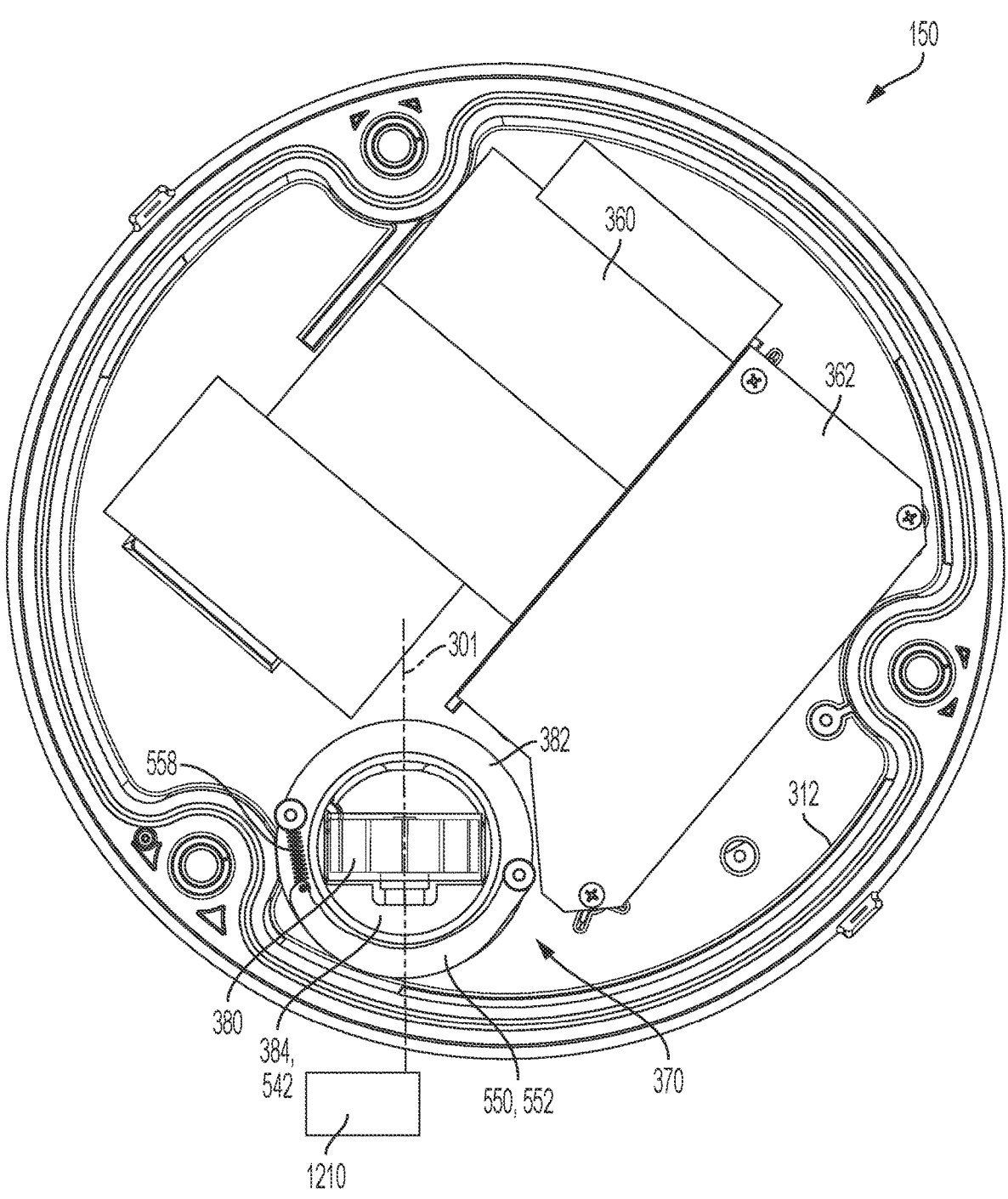
FIG. 12 is a front view of the nozzle cap of FIG. 2 shown with the cap cover of the nozzle cap removed, wherein the nozzle cap is in a second orientation.

FIG. 12 illustrates the nozzle cap 150 in a second orientation, wherein the vibration sensor 380 and the sensor axis 301 of the self-leveling sensor assembly 370 are oriented in a second potential position. In this second potential position, the sensor axis 301 can be generally oriented in a seven-o-clock position. As with the four-o-clock position illustrated in FIG. 3, in the present seven-o-clock position, the self-leveling sensor assembly 370 can automatically align the sensor axis 301 in the optimal vertical orientation. The demonstrated four-o-clock and seven-o-clock positions are merely exemplary and should not be viewed as limiting. The self-leveling sensor assembly 370 can vertically align the sensor axis 301 to achieve an optimal signal-to-noise ratio in any position of the vibration sensor 380. Thus, the nozzle cap 150 can be mounted to the nozzle 140*a* (shown in FIG. 1) of the fire hydrant 110 (shown in FIG. 1) and tightened to a suitable torque without concern for the positioning of the vibration sensor 380 housed therein, and without the need for alignment aids, such as spacers or gaskets of varying thicknesses.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A self-leveling sensor assembly comprising:
   an outer bushing defining a bushing passage, a bushing axis extending centrally through the bushing passage;
   an inner housing received in the bushing passage and rotatable about the bushing axis, the inner housing comprising a housing weight disposed at a first housing side of the inner housing; and
   a vibration sensor mounted to the inner housing and defining a sensor axis;
   wherein the housing weight is configured to pull the first housing side of the inner housing downward to rotate the inner housing and the vibration sensor about the bushing axis and to align the sensor axis in a desired orientation.

2. The self-leveling sensor assembly of claim 1, wherein the sensor axis is substantially perpendicular to the bushing axis.

3. The self-leveling sensor assembly of claim 2, wherein the inner housing defines a housing inner surface, the housing inner surface defines a housing passage, and the vibration sensor is received within the housing passage and coupled to the housing inner surface by a first sensor fastener.

4. The self-leveling sensor assembly of claim 3, wherein the housing weight is formed monolithically with the inner housing, the housing inner surface at least partially defining the housing weight.

5. The self-leveling sensor assembly of claim 1, wherein:
   the outer bushing defines a guide slot extending at least partially about a circumference of the outer bushing;
   the self-leveling sensor assembly further comprises a guide pin coupled to the inner housing; and
   the guide pin extends into the guide slot and is configured to slide within the guide slot as the inner housing rotates about the bushing axis.

6. The self-leveling sensor assembly of claim 5, wherein the guide slot extends about 180° about the circumference of the outer bushing.

7. The self-leveling sensor assembly of claim 6, wherein the inner housing defines a guide opening, an inner pin portion of the guide pin is received in the guide opening, an outer pin portion of the guide pin extends into the guide slot, and the guide opening and the guide pin are aligned with the sensor axis.

8. The self-leveling sensor assembly of claim 1, wherein:
the self-leveling sensor assembly further comprises a locking feature;
the locking feature comprises a locking wedge configurable in a locked configuration and an unlocked configuration,
in the locked configuration, the locking wedge engages the inner housing and prohibits the inner housing from rotating about the bushing axis; and
in the unlocked configuration, the locking wedge disengages the inner housing, and the inner housing can rotate freely about the bushing axis.

9. The self-leveling sensor assembly of claim 8, wherein the locking feature further comprises a locking spring, the locking spring biasing the locking wedge to the locked configuration.

10. The self-leveling sensor assembly of claim 9, wherein:
the locking feature is coupled to the outer bushing at a first bushing side of the outer bushing;
the outer bushing defines a second bushing side opposite the first bushing side; and
in the locked configuration, the locking wedge pushes the inner housing laterally against a bushing inner surface of the outer bushing at the second bushing side.

11. The self-leveling sensor assembly of claim 10, wherein:
the locking feature is disposed at a first bushing end of the outer bushing;
the bushing inner surface defines a circumferential groove;
the circumferential groove is disposed proximate to a second bushing end of the outer bushing, opposite the first bushing end;
a retaining ring is received in the circumferential groove; and
in the locked configuration, the locking wedge pushes the inner housing axially downward against the retaining ring relative to the bushing axis.

12. The self-leveling sensor assembly of claim 11, wherein:
the locking wedge defines an angled wedge surface;
the inner housing defines a housing top surface defining an angled portion complementary to the angled wedge surface; and
in the locked configuration, the angled wedge surface of the locking wedge pushes radially inward and axially downward against the angled portion of the housing top surface relative to the bushing axis.

13. The self-leveling sensor assembly of claim 1, wherein the desired orientation is a vertical orientation.

14. A leak detection assembly comprising:
a housing defining a cavity; and
a self-leveling sensor assembly disposed within the cavity, the self-leveling sensor assembly comprising:
an outer bushing defining a bushing passage;
an inner housing received within the bushing passage; and
a vibration sensor mounted to the inner housing and defining a sensor axis, wherein the inner housing is configured to rotate within the bushing passage to automatically align the sensor axis in a desired orientation.

15. The leak detection assembly of claim 14, wherein:
the housing defines a circumferential wall;
the circumferential wall at least partially encloses the cavity, a cap axis extending centrally through the cavity;
the outer bushing of the self-leveling sensor assembly is attached to the circumferential wall; and
the self-leveling sensor assembly extends substantially radially inwards from the circumferential wall with respect to the cap axis.

16. The leak detection assembly of claim 15, wherein the housing further comprises a cap fastener, the housing is a nozzle cap, and the cap fastener is configured to couple the nozzle cap to a nozzle of a fire hydrant.

17. The leak detection assembly of claim 16, wherein the cap fastener defines a threaded bore.

18. The leak detection assembly of claim 14, wherein the desired orientation is a vertical orientation.

19. The leak detection assembly of claim 18, wherein:
the outer bushing defines a bushing axis extending centrally through the bushing passage;
the inner housing comprises a housing weight disposed at a first housing side of the inner housing;
the housing weight is configured to pull the first housing side of the inner housing downward to rotate the inner housing and the vibration sensor about the bushing axis and to align the sensor axis vertically; and
the sensor axis is substantially perpendicular to the bushing axis.

20. The leak detection assembly of claim 19, wherein the inner housing defines a housing inner surface, the housing inner surface defines a housing passage, and the vibration sensor is received within the housing passage and coupled to the housing inner surface by a first sensor fastener.

21. The leak detection assembly of claim 19, wherein:
the outer bushing defines a guide slot extending at least partially about a circumference of the outer bushing;
the self-leveling sensor assembly further comprises a guide pin coupled to the inner housing; and
the guide pin extends into the guide slot and is configured to slide within the guide slot as the inner housing rotates about the bushing axis.

22. The leak detection assembly of claim 19, wherein:
the self-leveling sensor assembly further comprises a locking feature;
the locking feature comprises a locking wedge configurable in a locked configuration and an unlocked configuration,
in the locked configuration, the locking wedge engages the inner housing and prohibits the inner housing from rotating about the bushing axis; and
in the unlocked configuration, the locking wedge disengages the inner housing, and the inner housing can rotate freely about the bushing axis.

23. The leak detection assembly of claim 22, wherein the locking feature further comprises a locking spring, the locking spring biasing the locking wedge to the locked configuration.

24. The leak detection assembly of claim 23, wherein:
the locking feature is coupled to the outer bushing at a first bushing side of the outer bushing;
the outer bushing defines a second bushing side opposite the first bushing side; and in the locked configuration, the locking wedge pushes the
inner housing laterally against a bushing inner surface
of the outer bushing at the second bushing side.

25. The leak detection assembly of claim 24, wherein:

the locking feature is disposed at a first bushing end of the
outer bushing;

the bushing inner surface defines a circumferential
groove;

the circumferential groove is disposed proximate to a
second bushing end of the outer bushing, opposite the
first bushing end;

a retaining ring is received in the circumferential groove;
and in the locked configuration, the locking wedge pushes the
inner housing axially downward against the retaining
ring relative to the bushing axis.

26. A method of aligning a self-leveling sensor assembly
of a nozzle cap comprising:

mounting the nozzle cap to a nozzle of a fire hydrant,
wherein the nozzle cap comprises the self-leveling
sensor assembly, the self-leveling sensor assembly
comprising an outer bushing defining a bushing pas-
sage, an inner housing positioned in the bushing pas-
sage, and a sensor, the sensor defining a sensor axis;
and automatically rotating the inner housing relative to the
outer bushing to align the sensor axis in a desired
orientation.

27. The method of claim 26, wherein:

the self-leveling sensor assembly comprises a housing
weight coupled to the inner housing; and automatically rotating the inner housing within the outer
bushing comprises pulling the housing weight down-
ward under a force of gravity.

28. The method of claim 27, wherein the desired orien-
tation is a substantially vertical orientation, substantially
aligned with a direction of gravity.

29. The method of claim 28, wherein the sensor is coupled
to the inner housing and disposed substantially within a
housing passage of the inner housing.

30. The method of claim 26, wherein:

the self-leveling sensor assembly further comprises a
locking feature configurable in a locked configuration
and an unlocked configuration;

in the locked configuration, the locking feature engages
the inner housing and prohibits the inner housing from
rotating relative to the outer bushing;

in the unlocked configuration, the locking feature disen-
gages the inner housing, and the inner housing can
rotate freely relative to the outer bushing; and the method further comprises reconfiguring the locking
feature from the locked configuration to the unlocked
configuration.

31. The method of claim 30, wherein reconfiguring the
locking feature from the locked configuration to the
unlocked configuration comprises placing an unlocking
magnet in proximity to the locking feature and magnetically
pulling the locking feature away from the inner housing and
toward the unlocking magnet.

* * * * *